US012574640B2

(12) United States Patent
Lee

(10) Patent No.: US 12,574,640 B2
(45) Date of Patent: Mar. 10, 2026

(54) CAMERA MODULE

(71) Applicant: Samsung Electro-Mechanics Co., Ltd., Suwon-si (KR)

(72) Inventor: Kyung Hun Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 408 days.

(21) Appl. No.: 17/970,534

(22) Filed: Oct. 20, 2022

(65) Prior Publication Data

US 2023/0128842 A1 Apr. 27, 2023

(30) Foreign Application Priority Data

Oct. 21, 2021 (KR) ......................... 10-2021-0141305
Sep. 27, 2022 (KR) ......................... 10-2022-0122721

(51) Int. Cl.
| | |
|---|---|
| *H04N 23/68* | (2023.01) |
| *H04N 23/51* | (2023.01) |
| *H04N 23/54* | (2023.01) |
| *H04N 23/55* | (2023.01) |

(52) U.S. Cl.
CPC .......... *H04N 23/687* (2023.01); *H04N 23/51* (2023.01); *H04N 23/54* (2023.01); *H04N 23/55* (2023.01)

(58) Field of Classification Search
CPC ........ H04N 23/54; H04N 23/55; H04N 23/57; H04N 23/687
See application file for complete search history.

(56) References Cited

U.S. PATENT DOCUMENTS 11,641,515 B2 * 5/2023 Hsu ......................... H02K 33/02
348/373
2019/0141248 A1 5/2019 Hubert et al.
(Continued)

FOREIGN PATENT DOCUMENTS

| CN | 108780207 A | 11/2018 |
|---|---|---|
| CN | 111226152 A | 6/2020 |

(Continued)

OTHER PUBLICATIONS

Korean Office Action issued on May 27, 2024, in counterpart Korean Patent Application No. 10-2022-0122721 (9 pages in English, 7 pages in Korean).
(Continued)

*Primary Examiner* — Amy R Hsu
(74) *Attorney, Agent, or Firm* — NSIP Law

(57) ABSTRACT

A camera module includes an autofocusing (AF) housing having an internal space; a lens module disposed in the internal space of the AF housing and configured to be movable in an optical axis direction of the lens module relative to the AF housing; a sensor substrate on which an image sensor configured to receive light passing through the lens module is disposed; a moving frame coupled to a portion of the sensor substrate; and an optical image stabilization (OIS) housing disposed between the AF housing and the moving frame, wherein the AF housing is configured to be movable relative to the OIS housing together with the lens module in a direction perpendicular to an optical axis of the lens module, and the moving frame is configured to be movable together with the image sensor in the direction perpendicular to the optical axis.

37 Claims, 25 Drawing Sheets

(56)                References Cited

U.S. PATENT DOCUMENTS

| | | | |
|---|---|---|---|
| 2019/0238728 A1* | 8/2019 | Hwang ................. | H04N 23/57 |
| 2020/0033699 A1 | 1/2020 | Kim | |
| 2021/0048730 A1 | 2/2021 | Jeong et al. | |
| 2021/0173224 A1 | 6/2021 | Seo et al. | |
| 2021/0195073 A1* | 6/2021 | Saito ........................ | H04N 23/60 |
| 2021/0208417 A1 | 7/2021 | Choi et al. | |
| 2021/0258491 A1 | 8/2021 | Park | |
| 2021/0281759 A1 | 9/2021 | Seo et al. | |
| 2022/0286591 A1 | 9/2022 | Seo et al. | |
| 2023/0023813 A1 | 1/2023 | Oh | |
| 2023/0224585 A1* | 7/2023 | Sugawara .............. | H04N 23/55 |
| | | | 396/55 |
| 2023/0251550 A1* | 8/2023 | Go .......................... | G03B 5/00 |
| 2024/0380975 A1* | 11/2024 | Park .................... | H04N 23/683 |

FOREIGN PATENT DOCUMENTS

| | | | |
|---|---|---|---|
| CN | 112136308 A | 12/2020 | |
| CN | 112369008 A | 2/2021 | |
| CN | 113050340 A | 6/2021 | |
| CN | 113341629 A | 9/2021 | |
| JP | 2018-17944 A | 2/2018 | |
| JP | 2021-99417 A | 7/2021 | |
| KR | 10-2019-0061439 A | 6/2019 | |
| KR | 10-2020-0092924 A | 8/2020 | |
| KR | 10-2020-0123599 A | 10/2020 | |
| KR | 10-2021-0020731 A | 2/2021 | |
| KR | 10-2021-0026324 A | 3/2021 | |
| KR | 10-2021-0081556 A | 7/2021 | |
| WO | WO 2015/147385 A1 | 10/2015 | |

OTHER PUBLICATIONS

Indian Office Action issued on Sep. 12, 2025, in counterpart Indian Patent Application No. 202214059667 (13 pages in English).
Chinese Office Action issued on Jan. 30, 2026, in counterpart Chinese Patent Application No. 202211293837.0 (4 pages in English, 10 pages in Chinese).

* cited by examiner

800

830

XXI–XXI'

XXII–XXII'

CAMERA MODULE

CROSS-REFERENCE TO RELATED APPLICATIONS

This application claims the benefit under 35 USC 119(a) of Korean Patent Application Nos. 10-2021-0141305 filed on Oct. 21, 2021, and 10-2022-0122721 filed on Sep. 27, 2022, in the Korean Intellectual Property Office, the entire disclosures of which are incorporated herein by reference for all purposes.

BACKGROUND

1. Field

The present disclosure relates to a camera module.

2. Description of Related Art

In recent years, a camera module has been used in a mobile communications terminal such as a tablet personal computer (PC) or a laptop computer, as well as a smartphone.

The camera module includes an actuator having an auto-focusing (AF) function and an optical image stabilization (OIS) function to generate a high-resolution image.

For example, the autofocusing may be performed by moving a lens module in an optical axis direction, and the optical image stabilization may be performed by moving the lens module in a direction perpendicular to an optical axis.

However, the lens module may also have an increased weight due to improved performance of the camera module. In addition, the weight of a driving portion for moving the lens module makes it difficult to precisely control a driving force for performing optical image stabilization.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes an autofocusing (AF) housing having an internal space; a lens module disposed in the internal space of the AF housing and configured to be movable relative to the AF housing in an optical axis direction of the lens module relative to the AF housing; a sensor substrate on which an image sensor configured to receive light passing through the lens module is disposed; a moving frame coupled to a portion of the sensor substrate; and an optical image stabilization (OIS) housing disposed between the AF housing and the moving frame, wherein the AF housing is configured to be movable relative to the OIS housing together with the lens module in a direction perpendicular to an optical axis of the lens module, and the moving frame is configured to be movable together with the image sensor in the direction perpendicular to the optical axis.

The camera module may further include a first driving portion including a first magnet coupled to the lens module, and a first coil facing the first magnet; and a first ball unit disposed between the AF housing and the lens module, wherein the first ball unit may include a first ball group and a second ball group spaced apart from each other in a first axis direction perpendicular to the optical axis and each including a plurality of balls disposed in a direction parallel to the optical axis, and a number of the plurality of balls of the first ball group may be greater than a number of the plurality of balls of the second ball group.

The lens module may include a first guide part protruding in the optical axis direction, the AF housing may include a second guide part protruding in the optical axis direction and accommodating the first guide part of the lens module, guide grooves may be formed in each of surfaces of the first guide part and the second guide part facing each other in the direction perpendicular to the optical axis, and the plurality of balls of the first ball group and the plurality of balls of the second ball group may be disposed in the guide grooves.

The camera module may further include a first protrusion part and a second protrusion part each disposed on the second guide part of the AF housing, wherein the first protrusion part may protrude toward the first ball group in the optical axis direction, the second protrusion part may protrude toward the second ball group in the optical axis direction, and a length of the second protrusion part in the optical axis direction may be greater than a length of the first protrusion part in the optical axis direction.

The OIS housing may include a stepped part accommodating at least a portion of the second guide part of the AF housing.

The AF housing may be further configured to be movable relative to the OIS housing in a first axis direction perpendicular to the optical axis or a second axis direction perpendicular to both the optical axis and the first axis direction.

The moving frame may be further configured to be movable relative to the OIS housing in a first axis direction perpendicular to the optical axis or a second axis direction perpendicular to both the optical axis and the first axis direction.

A movement of the AF housing and a movement of the moving frame may be controllable independently of each other.

The camera module may further include a second driving portion including a plurality of magnets disposed on the OIS housing, and a plurality of coils fixed to the AF housing; a third driving portion including a plurality of magnets disposed on the OIS housing, and a plurality of coils fixed to the moving frame; a second ball unit disposed between the AF housing and the OIS housing; and a third ball unit disposed between the OIS housing and the moving frame.

The second driving portion may include a first sub-driving portion configured to generate a driving force in a first axis direction perpendicular to the optical axis; and a second sub-driving portion configured to generate a driving force in a second axis direction perpendicular to both the optical axis and the first axis direction, the first sub-driving portion may include a second magnet disposed on the OIS housing and a second coil fixed to the AF housing, and the second sub-driving portion may include a third magnet disposed on the OIS housing and a third coil fixed to the AF housing.

Either one or both of the second magnet and the third magnet may include two magnets, either one or both of the second coil and the third coil may include two coils, and the second driving portion may further include at least two position sensors facing the two magnets.

The third driving portion may include a third sub-driving portion configured to generate a driving force in a first axis direction perpendicular to the optical axis; and a fourth sub-driving portion configured to generate a driving force in a second axis direction perpendicular to both the optical axis and the first axis direction, the third sub-driving portion may include a fourth magnet disposed on the OIS housing and a fourth coil fixed to the moving frame, and the fourth sub-driving portion may include a fifth magnet disposed on the OIS housing and a fifth coil fixed to the moving frame.

Either one or both of the fourth magnet and the fifth magnet may include two magnets, either one or both of the fourth coil and the fifth coil may include two coils, and the third driving portion may further include at least two position sensors facing the two magnets.

The moving frame may include a first frame in which the plurality of coils of the third driving portion are mounted; a second frame to which the first frame is coupled; and a wiring pattern disposed in the first frame and connected to the plurality of coils of the third driving portion, and a portion of the wiring pattern may be exposed externally from the first frame or the second frame.

The first frame and the second frame may be made of a same plastic material or different plastic materials, and a boundary line is formed where the first frame and the second frame contact each other.

A portion of the wiring pattern may be connected to the sensor substrate.

The second ball unit may include a plurality of second balls, the third ball unit may include a plurality of third balls, guide grooves in which the plurality of second balls of the second ball unit are disposed may be formed in either one or both of surfaces of the AF housing and the OIS housing facing each other in the optical axis direction, guide grooves in which the plurality of third balls of the third ball unit are disposed may be formed in either one or both of surfaces of the OIS housing and the moving frame facing each other in the optical axis direction, each of the guide grooves in which the plurality of second balls of the second ball unit are disposed may have a polygonal or circular shape having a size larger than a diameter of each of the plurality of second balls of the second ball unit, and each of the guide grooves in which the plurality of third balls of the third ball unit are disposed may have a polygonal or circular shape having a size larger than a diameter of each of the plurality of third balls of the third ball unit.

The sensor substrate may include a first OIS substrate and a second OIS substrate, a portion of the first OIS substrate may be coupled to the AF housing, and a portion of the second OIS substrate may be coupled to the moving frame.

The first OIS substrate may include a first moving part coupled to the AF housing; a first fixed part coupled to the OIS housing; and a first connection part connecting the first moving part and the first fixed part to each other, the first connection part may extend along at least a portion of a perimeter of the moving part, and the first connection part may include a plurality of slits each passing through the first connection part in the optical axis direction.

The first connection part may further include a first support part and a second support part, the first support part may be connected to the first moving part and spaced apart from the first fixed part, and the second support part may be connected to the first fixed part and spaced apart from the first moving part.

The second OIS substrate may include a second moving part coupled to the moving frame; a second fixed part coupled to the OIS housing; and a second connection part connecting the second moving part and the second fixed part to each other, the second connection part may extend along the perimeter of the moving part, and the second connection part may include a plurality of slits passing through the second connection part in the optical axis direction.

The second connection part may include a third support part and a fourth support part, the third support part may be connected to the second fixed part and spaced apart from the second moving part, and the fourth support part may be connected to the second moving part and spaced apart from the second fixed part.

In another general aspect, a camera module includes an autofocusing (AF) housing having an internal space; a lens module disposed in the internal space of the AF housing; a sensor substrate on which an image sensor configured to receive light passing through the lens module is disposed; a moving frame coupled to a portion of the sensor substrate; an optical image stabilization (OIS) housing disposed between the AF housing and the moving frame; a first ball unit disposed between the AF housing and the lens module; a second ball unit disposed between the AF housing and the OIS housing; and a third ball unit disposed between the OIS housing and the moving frame, wherein the lens module is configured to be movable in directions of three axes perpendicular to one another, and the image sensor is configured to be movable on a plane perpendicular to an optical axis of the lens module.

The lens module may be further configured to be movable in an optical axis direction of the lens module relative to the AF housing, and movable relative to the OIS housing on a second plane perpendicular to the optical axis together with the AF housing.

The image sensor may be further configured to be movable on the plane perpendicular to the optical axis together with the moving frame.

The lens module and the image sensor may be further configured to move in opposite directions along an axis perpendicular to the optical axis during optical image stabilization.

The sensor substrate may include an autofocusing (AF) substrate; a first optical image stabilization (OIS) substrate; and a second optical image stabilization (OIS) substrate, the AF substrate may be coupled to the AF housing, a portion of the first OIS substrate may be coupled to the AF housing and another portion of the first OIS substrate may be coupled to the OIS housing, and a portion of the second OIS substrate may be coupled to the moving frame and another portion of the second OIS substrate may be coupled to the OIS housing.

The camera module may further include a first driving portion configured to generate a driving force in the optical axis direction, and including a magnet and a coil; a second driving portion configured to generate a driving force in a first axis direction perpendicular to the optical axis direction or a second axis direction perpendicular to both the optical axis direction and the first axis direction, and including a plurality of magnets and a plurality of coils; and a third driving portion configured to generate a driving force in the first axis direction or the second axis direction, and including a plurality of magnets and a plurality of coils, wherein the coil of the first driving portion may be disposed on the AF substrate, the plurality of coils of the second driving portion may be disposed on the first OIS substrate, and the plurality of coils of the third driving portion may be disposed on the second OIS substrate.

In another general aspect, a camera module includes a lens module; an image sensor configured to receive light passing through the lens module; a first driving portion configured to drive the lens module in an optical axis direction of the lens module to perform autofocusing; a second driving portion configured to drive the lens module on a first plane perpendicular to an optical axis of the lens module to perform optical image stabilization; and a third driving portion configured to drive the image sensor on a second plane perpendicular to the optical axis of the lens module to perform optical image stabilization while the lens module is being driven by the second driving portion to perform optical image stabilization.

The second driving portion may be further configured to drive the lens module on the first plane in one direction; and the third driving portion may be further configured to drive the image sensor on the second plane in another direction opposite to the one direction.

The second driving portion may be further configured to drive the lens module on the first plane in a first axis direction perpendicular to the optical axis, and a second axis direction perpendicular to the optical axis and the first axis direction, and the third driving portion may be further configured to drive the image sensor on the second plane in the first axis direction and the second axis direction.

The second driving portion may be further configured to rotate the lens module about the optical axis of the lens module or an optical axis parallel to the optical axis of the lens module, and the third driving portion may be further configured to rotate the image sensor about the optical axis of the lens module or the optical axis parallel to the optical axis of the lens module.

In another general aspect, a camera module includes an autofocusing (AF) housing; a lens module supported by the AF housing and configured to be movable relative to the AF housing in an optical axis direction of the lens module; a moving frame; an image sensor configured to receive light passing through the lens module and coupled to the moving frame to maintain the image sensor at a fixed position relative to the moving frame; an optical image stabilization (OIS) housing disposed between the AF housing and the moving frame, wherein the AF housing is configured to be movable together with the lens module relative to the OIS housing in a first axis direction perpendicular to an optical axis of the lens module and a second axis direction perpendicular to both the optical axis and the first axis direction, and to be rotatable about the optical axis or an axis parallel to the optical axis; and the moving frame is configured to be movable together with the image sensor relative to the OIS housing in the first axis direction and the second axis direction, and to be rotatable about the optical axis or the axis parallel to the optical axis.

The camera module may further include a first driving portion including a first magnet disposed on the lens module, and a first coil supported by the AF housing and facing the first magnet, the first driving portion being configured to drive the lens module in the optical axis direction; a second driving portion including a second magnet and a third magnet disposed on the OIS housing, and a second coil and a third coil supported by the AF housing and respectively facing the second magnet and the third magnet, the second driving portion being configured to drive the AF housing together with lens module relative to the OIS housing in the first axis direction and the second axis direction, and to rotate the AF housing together with the lens module about the optical axis or the axis parallel to the optical axis; and a third driving portion including a fourth magnet and a fifth magnet disposed on the OIS housing, and a fourth coil and a fifth coil supported by the moving frame and respectively facing the fourth magnet and the fifth magnet, the third driving portion being configured to drive the moving frame together with the image sensor relative to the OIS housing in the first axis direction and the second axis direction, and to rotate the moving frame together with the image sensor about the optical axis or the axis parallel to the optical axis.

The lens module may include a first part protruding farther in the optical axis direction toward the AF housing than a remaining part of the lens module, and the first magnet may be mounted on the first part of the lens module, and the AF housing may include a second part protruding farther in the optical axis direction toward the OIS housing than a remaining part of the AF housing, and the first coil may be mounted on the second part of the AF housing.

The AF housing may include through-holes in which the second coil and the third coil are disposed, the OIS housing may include mounting grooves on a surface of the OIS housing facing the AF housing in which the second magnet and the third magnet are disposed, and mounting grooves on a surface of the OIS housing facing the moving frame in which the fourth magnet and the fifth magnet are disposed, and the moving frame may include mounting grooves on a surface of the moving frame facing the OIS housing in which the fourth coil and the fifth coil are disposed.

The camera module may further include a first driving portion including a first magnet disposed on the lens module, and a first coil supported by the AF housing and facing the first magnet, the first driving portion being configured to drive the lens module in the optical axis direction; a first common magnet and a second common magnet supported by the OIS housing;

a second driving portion including a second coil and a third coil supported by the AF housing and respectively facing the first common magnet in the first axis direction and the second common magnet in the second axis direction, the second driving portion being configured to drive the AF housing together with lens module relative to the OIS housing in the first axis direction and the second axis direction, and to rotate the AF housing together with the lens module about the optical axis or the axis parallel to the optical axis; and a third driving portion including a fourth coil and a fifth coil supported by the moving frame and respectively facing the first common magnet in the optical axis direction and the fifth magnet in the optical axis direction, the third driving portion being configured to drive the moving frame together with the image sensor relative to the OIS housing in the first axis direction and the second axis direction, and to rotate the moving frame together with the image sensor about the optical axis or the axis parallel to the optical axis.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
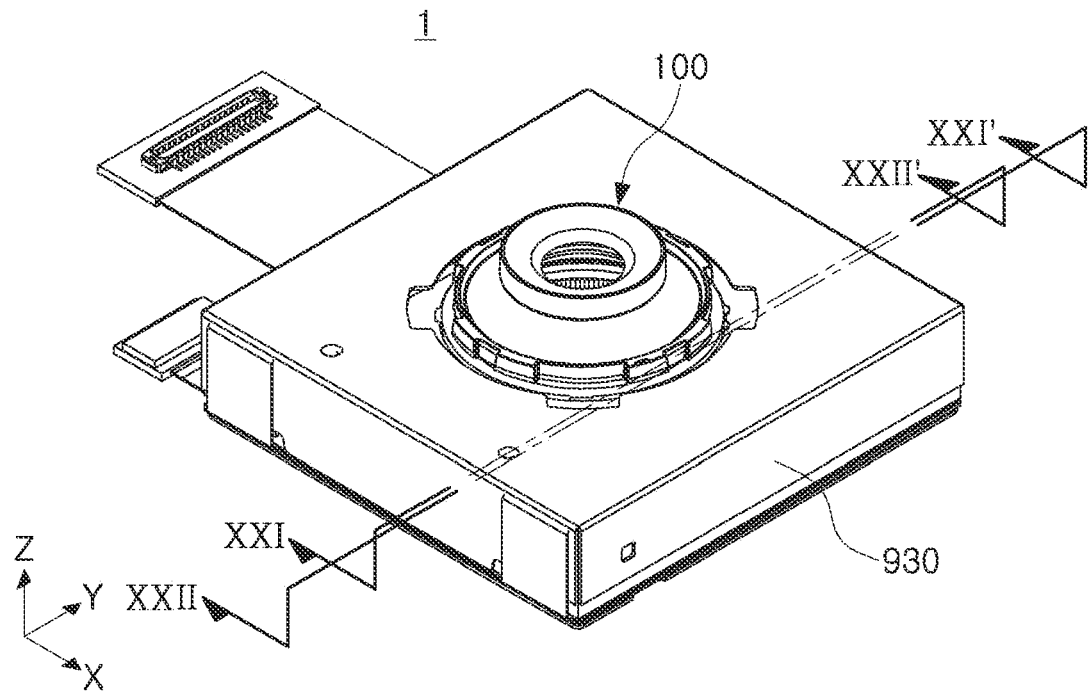
FIG. 1 is a perspective view of a camera module according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Figure 2:
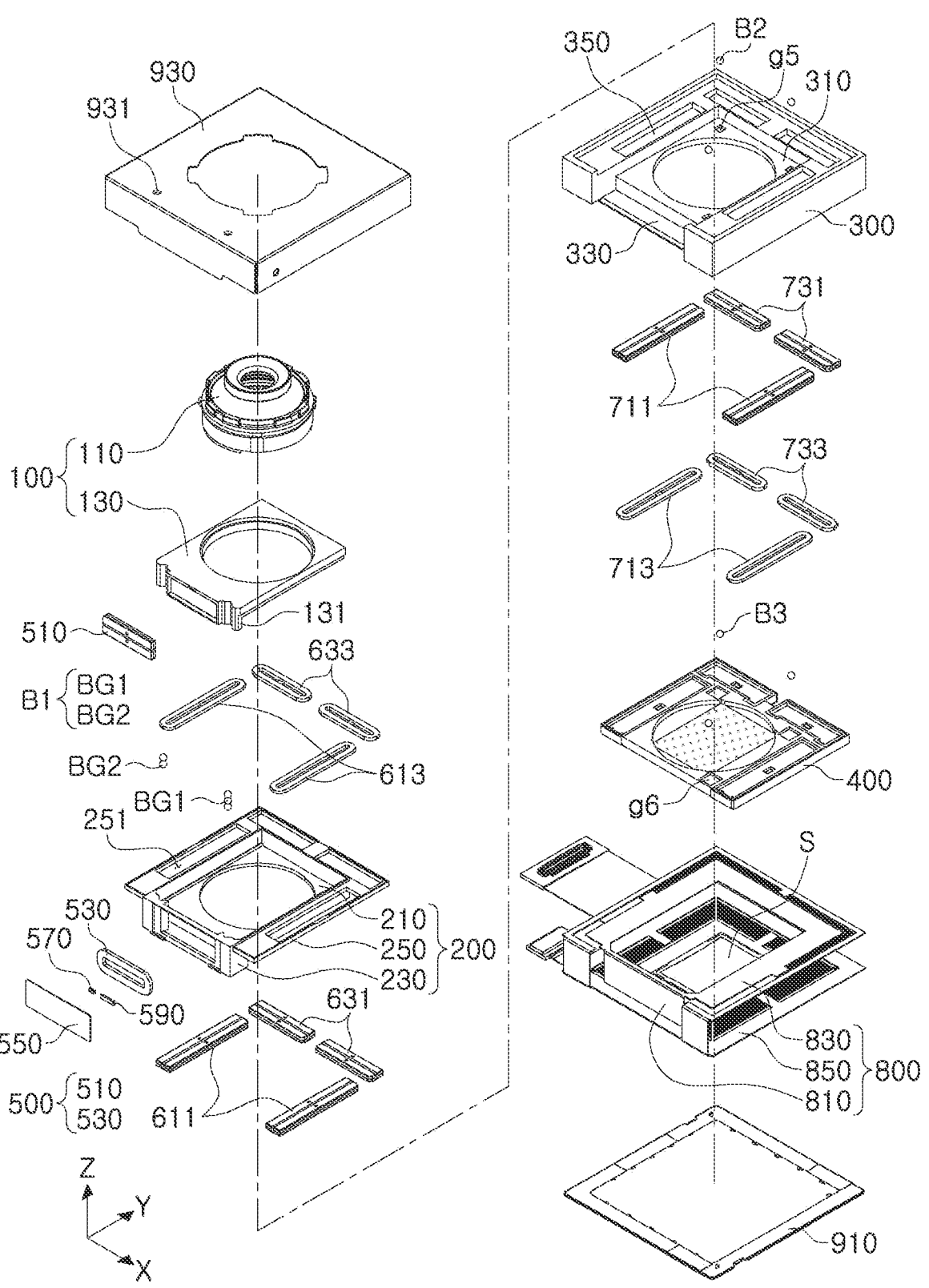
FIG. 2 is a schematic exploded perspective view of the camera module of FIG. 1.

FIG. 1 is a perspective view of a camera module according to an embodiment of the present disclosure. FIG. 2 is a schematic exploded perspective view of the camera module of FIG. 1.

A camera module 1 according to an embodiment of the present disclosure may be mounted on a portable electronic device. The portable electronic device may be a portable electronic device such as a mobile communications terminal, a smartphone, or a tablet personal computer (PC).

Referring to FIGS. 1 and 2, the camera module 1 according to an embodiment of the present disclosure may include a lens module 100, an autofocusing (AF) housing 200, an optical image stabilization (OIS) housing 300, a moving frame 400, and a sensor substrate 800.

The lens module 100 may include a lens barrel 110 and a carrier 130. At least one lens may be disposed in the lens barrel 110. When a plurality of lenses are disposed in the lens barrel 110, the plurality of lenses may be mounted in the lens barrel 110 in an optical axis (Z-axis).

The lens barrel 110 may be coupled to the carrier 130. The carrier 130 may include a hollow part passing through the carrier 130 in an optical axis (Z-axis) direction, and the lens barrel 110 may be inserted into the hollow part and fixed to the carrier 130. Accordingly, when the carrier 130 is moved, the lens barrel 110 may be moved together with the carrier 130.

The lens module 100 may be accommodated in the AF housing 200. In an embodiment, the lens module 100 may be a moving member that moves in the optical axis (Z-axis) direction during the autofocusing (AF).

The camera module 1 according to an embodiment of the present disclosure may include a first driving portion 500 to move the lens module 100.

The lens module 100 may perform the autofocusing by being moved relative to the AF housing 200 by the first driving portion 500 in the optical axis (Z-axis) direction.

The AF housing 200 may be disposed on one side of the OIS housing 300 in the optical axis (Z-axis) direction, and the moving frame 400 may be disposed on the other side of the OIS housing 300 in the optical axis (Z-axis) direction. In addition, the moving frame 400 may be coupled to a portion of the sensor substrate 800 on which an image sensor S is mounted.

In an embodiment of the present disclosure, either one or both of the AF housing 200 and the moving frame 400 may be a moving member that moves on a plane perpendicular to the optical axis (Z-axis) during the optical image stabilization (OIS).

The camera module 1 according to an embodiment of the present disclosure may include a second driving portion 600 (see FIG. 9) to move the AF housing 200, and a third driving portion 700 (see FIG. 12) to move the moving frame 400.

The AF housing 200 may perform the optical image stabilization by being moved relative to the OIS housing 300 on the plane perpendicular to the optical axis (Z-axis) by the second driving portion 600. The lens module 100 may be accommodated in the AF housing 200, and the lens module 100 may thus also be moved together with the AF housing 200 as the AF housing 200 is moved.

In addition, the moving frame 400 may perform the optical image stabilization by being moved relative to the OIS housing 300 by the third driving portion 700 on the plane perpendicular to the optical axis (Z-axis). The moving frame 400 may be moved together with the image sensor S.

That is, the image sensor S may be moved by the third driving portion 700 in a direction perpendicular to a direction in which an imaging surface of the image sensor S is oriented. For example, the image sensor S may perform the optical image stabilization by being moved in the direction perpendicular to the optical axis (Z-axis) or rotated about the optical axis (Z-axis).

A case 930 may be coupled to the OIS housing 300 to protect components in the camera module 1.

The case 930 may include protrusions 931 protruding toward a first ball unit B1 described below. The protrusions 931 may serve as stoppers and buffer members for limiting a movement range of the first ball unit B1.

In the camera module 1 according to an embodiment of the present disclosure, the lens module 100 may be a moving member during the autofocusing (AF), and the AF housing 200 may be a fixed member during the autofocusing (AF), and may be a moving member during the optical image stabilization (OIS). In addition, the moving frame 400 (or the image sensor S) may be a fixed member during the autofocusing (AF), and may be a moving member during the optical image stabilization (OIS).

In this specification, the direction in which the imaging surface of the image sensor S is oriented may be referred to as the optical axis (Z-axis) direction. That is, the image sensor S may be moved in the direction perpendicular to the optical axis (Z-axis).

In this specification, when the image sensor S is moved in a direction parallel to the imaging surface, it may be understood that the image sensor S is moved in the direction perpendicular to the optical axis (Z-axis).

In addition, when the image sensor S is moved in a first axis direction (or X-axis direction) or a second axis direction (or Y-axis direction), it may be understood that the image sensor S is moved in the direction perpendicular to the optical axis (Z-axis).

In addition, it has been described above that the image sensor S is rotated about the optical axis (Z-axis) for convenience. However, the rotation axis when the image sensor S is rotated need not coincide with the optical axis (Z-axis). For example, the image sensor S may be rotated about any axis perpendicular to the direction in which the imaging surface of the image sensor S is oriented, i.e., any axis parallel to the optical axis (Z-axis).

In addition, the first axis direction (or X-direction) and the second axis direction (or Y-axis direction) may be examples of two directions perpendicular to the optical axis (Z-axis) and intersecting each other. In this specification, the first axis direction (X-axis direction) and the second axis direction (Y-axis direction) may be understood as two directions perpendicular to the optical axis (Z-axis) and intersecting each other.

Figure 3:
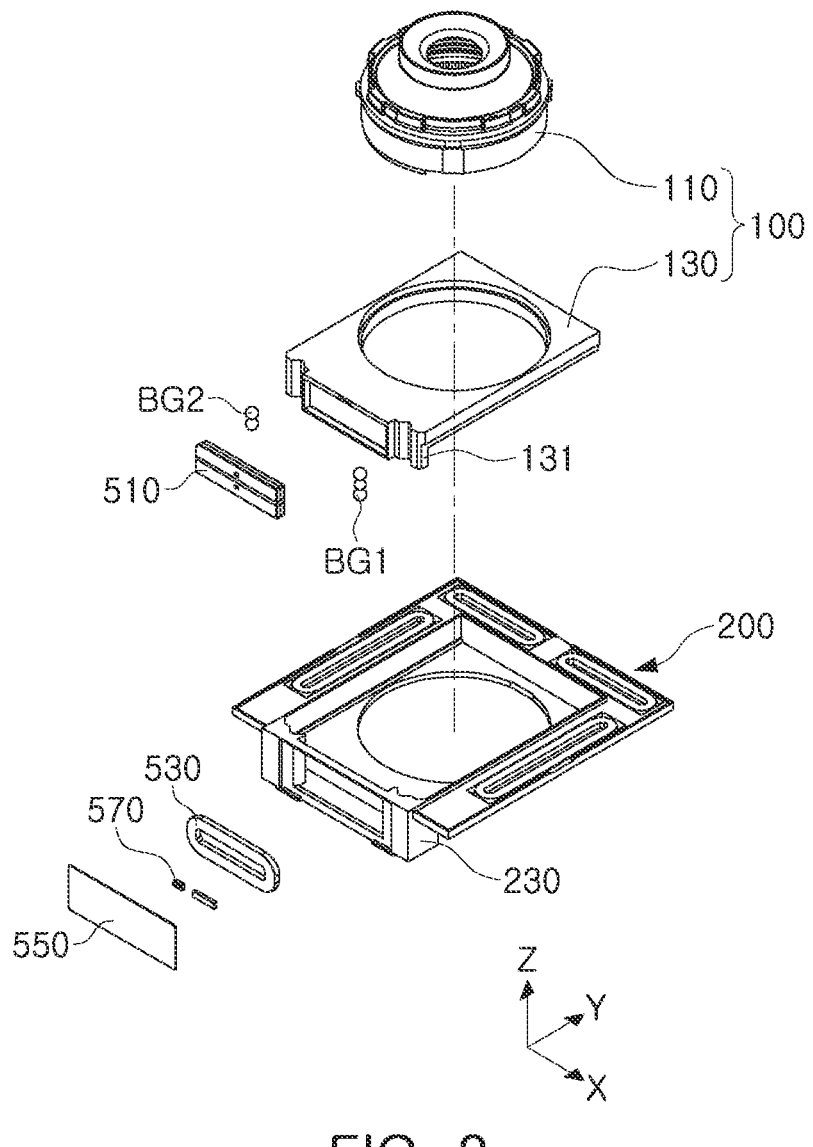
FIG. 3 is an exploded perspective view of a lens barrel, a carrier, an autofocusing (AF) housing, and a first driving portion.
Figure 4:
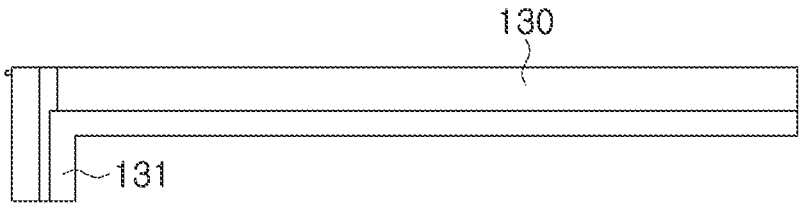
FIG. 4 is a side view of the carrier and the AF housing.
Figure 4:
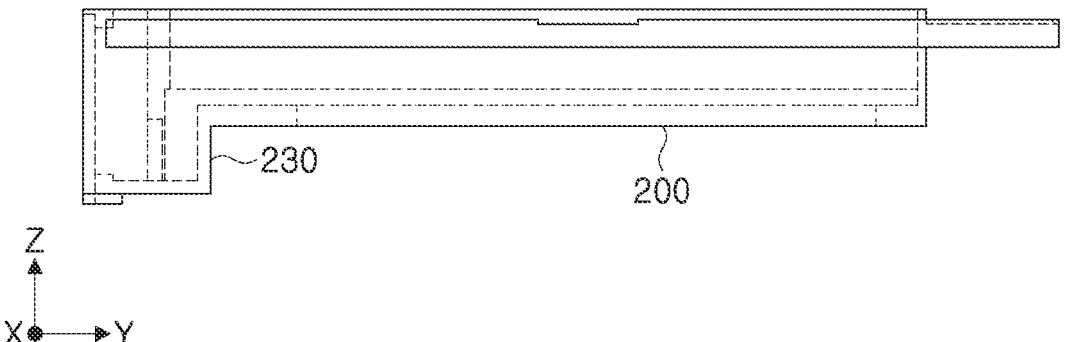
Figure 5:
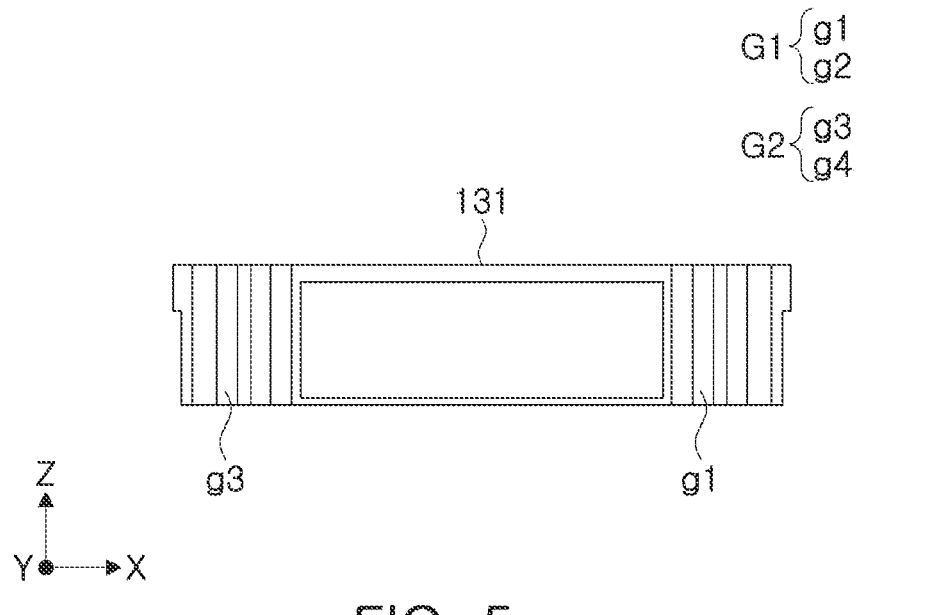
FIG. 5 is a front view of the carrier.
Figure 6:
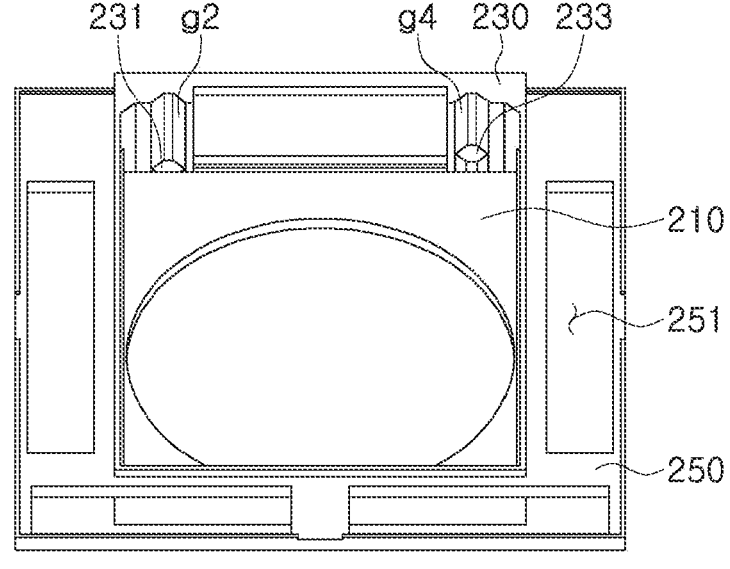
FIG. 6 is a perspective view of the AF housing.
Figure 7:
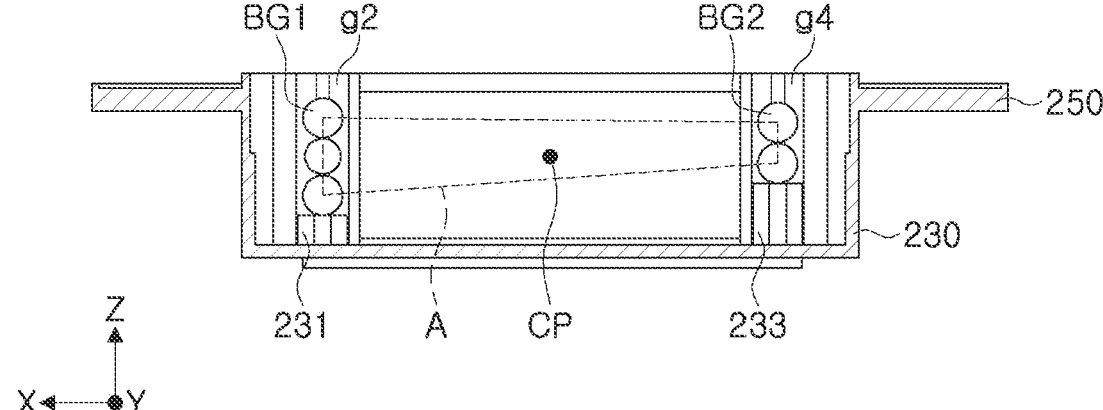
FIG. 7 is a view showing a first ball unit disposed in the AF housing.

FIG. 3 is an exploded perspective view of a lens barrel, a carrier, an autofocusing (AF) housing, and a first driving portion. FIG. 4 is a side view of the carrier and the AF housing. FIG. 5 is a front view of the carrier. FIG. 6 is a perspective view of the AF housing. FIG. 7 is a view showing a first ball unit disposed in the AF housing.

The following description describes movement of the lens module in the optical axis (Z-axis) direction with reference to FIGS. 3 through 7.

First, referring to FIG. 3, the lens module 100 may include the lens barrel 110 and the carrier 130 coupled to the lens barrel 110. Alternatively, the lens barrel 110 and the carrier 130 may be integrally formed with each other.

The carrier 130 may include a hollow part passing through the carrier 130 in the optical axis (Z-axis) direction, and the lens barrel 110 may be inserted into the hollow part to be fixed to the carrier 130. Accordingly, the lens barrel 110 and the carrier 130 may be moved together in the optical axis (Z-axis) direction.

The AF housing 200 may have an internal space, and may have a shape of a rectangular box having an open top and an open bottom. The carrier 130 may be disposed in the internal space of the AF housing 200.

The first driving portion 500 may generate a driving force in the optical axis (Z-axis) direction to move the carrier 130 in the optical axis (Z-axis) direction.

The first driving portion 500 may include a first magnet 510 and a first coil 530. The first magnet 510 and the first coil 530 may be disposed to face each other in the direction perpendicular to the optical axis (Z-axis).

The first magnet 510 may be disposed on the carrier 130. For example, the first magnet 510 may be disposed on one side of the carrier 130.

One side of the carrier 130 may protrude farther in the optical axis (Z-axis) direction than the other portion of the carrier 130. For example, the carrier 130 may include a first guide part 131 protruding farther in the optical axis (Z-axis) direction than the other portion of the carrier 130, and the first magnet 510 may be disposed on the first guide part 131. Therefore, the camera module 1 may have a smaller height (or may be made slim) by reducing the height of the other portion of the carrier 130 while securing an installation space for the first magnet 510 to secure a driving force.

A back yoke (not shown) may be disposed between the carrier 130 and the first magnet 510. The back yoke may improve a driving force by preventing a magnetic flux of the first magnet 510 from leaking.

The first magnet 510 may be magnetized so that one surface (e.g., a surface facing the first coil 530) thereof has both an N pole and an S pole. For example, the N pole, a neutral region, and the S pole may be sequentially positioned on one surface of the first magnet 510 facing the first coil 530 in the optical axis (Z-axis) direction.

The other surface (e.g., another surface opposite to the one surface) of the first magnet 510 may be magnetized to have both an S pole and an N pole. For example, the S pole, a neutral region, and the N pole may be sequentially positioned on the other surface of the first magnet 510 in the optical axis (Z-axis) direction so that the S pole on the other surface opposes the N pole on the one surface, and the N pole on the other surface opposes the S pole on the one surface.

The first coil 530 may be disposed to face the first magnet 510. For example, the first coil 530 may be disposed to face the first magnet 510 in the direction perpendicular to the optical axis (Z-axis).

The first coil 530 may be disposed on autofocusing (AF) substrate 810, and the AF substrate 810 may be mounted in the AF housing 200 so that the first magnet 510 and the first coil 530 face each other in the direction perpendicular to the optical axis (Z-axis). The AF substrate 810 may be a component of the sensor substrate 800 described below.

One side of the AF housing 200 may protrude farther in the optical axis (Z-axis) direction than the other portion of the AF housing 200. For example, the AF housing 200 may include a second guide part 230 protruding farther in the optical axis (Z-axis) direction than the other portion of the AF housing 200, and the AF substrate 810 may be mounted on the second guide part 230.

In addition, as shown in FIGS. 4 and 6, the second guide part 230 may have an accommodation space for accommodating the first guide part 131.

Therefore, the camera module 1 may have its height made slim by reducing the height of the other portion of the AF housing 200 while securing a space where the first driving portion 500 is installed to secure a driving force.

During the autofocusing, the first magnet 510 may be a moving member mounted on the carrier 130 and moved in the optical axis (Z-axis) direction together with the carrier 130, and the first coil 530 may be a fixed member mounted on the AF substrate 810.

When power is applied to the first coil 530, the carrier 130 may be moved in the optical axis (Z-axis) direction by an electromagnetic force generated between the first magnet 510 and the first coil 530.

The lens barrel 110 may be disposed on the carrier 130, and the lens barrel 110 may thus also be moved in the optical axis (Z-axis) direction by the movement of the carrier 130.

The first ball unit B1 may be disposed between the carrier 130 and the AF housing 200. For example, the first ball unit B1 may be disposed between the first guide part 131 of the carrier 130 and the second guide part 230 of the AF housing 200.

The first ball unit B1 may include a first ball group BG1 and a second ball group BG2. The first ball group BG1 and the second ball group BG2 may be spaced apart from each other in the direction perpendicular to the optical axis (Z-axis).

The first ball group BG1 and the second ball group BG2 may each include a plurality of balls disposed in the optical axis (Z-axis) direction. The plurality of balls may roll in the optical axis (Z-axis) direction when the carrier 130 is moved in the optical axis (Z-axis) direction.

A first yoke 550 may be disposed in the AF housing 200. The first yoke 550 may be disposed to face the first magnet 510. For example, the first coil 530 may be disposed on one surface of the AF substrate 810, and the first yoke 550 may be disposed on the other surface of the AF substrate 810.

The first magnet 510 and the first yoke 550 may generate an attractive force between each other. For example, the attractive force may act between the first magnet 510 and the first yoke 550 in the direction perpendicular to the optical axis (Z-axis).

Due to the attractive force between the first magnet 510 and the first yoke 550, the first ball unit B1 may be maintained in contact with the carrier 130 and the AF housing 200.

Guide grooves may be formed in surfaces of the carrier 130 and the AF housing 200 facing each other. For example, a first guide groove part G1 may be formed in one of the surfaces of the carrier 130 and the AF housing 200 facing each other, and a second guide groove part G2 may be formed in the other one of the surfaces of the carrier 130 and the AF housing 200 facing each other. The first guide groove part G1 and the second guide groove part G2 may be spaced apart from each other in the direction (e.g., first axis (X-axis) direction) perpendicular to the optical axis (Z-axis).

The first guide groove part G1 and the second guide groove part G2 may extend in the direction parallel to the optical axis (Z-axis), and be formed in the first guide part 131 of the carrier 130 and the second guide part 230 of the AF housing 200.

The first guide groove part G1 and the second guide groove part G2 may extend in the direction parallel to the optical axis (Z-axis). The first ball group BG1 may be disposed in the first guide groove part G1, and the second ball group BG2 may be disposed in the second guide groove part G2.

The first guide groove part G1 may include a first guide groove g1 formed in the first guide part 131 of the carrier 130 and a second guide groove g2 formed in the second guide part 230 of the AF housing 200; and the second guide groove part G2 may include a third guide groove g3 formed in the first guide part 131 of the carrier 130 and a fourth guide groove g4 formed in the second guide part 230 of the AF housing 200. Each of the first to fourth guide grooves g1 to g4 may be elongated in the direction parallel to the optical axis (Z-axis).

The first guide groove g1 and the second guide groove g2 may be disposed to face each other in the direction (e.g., second axis (Y-axis) direction) perpendicular to the optical axis (Z-axis) direction, and the first ball group BG1 may be disposed in a space between the first guide groove g1 and the second guide groove g2.

Among the plurality of balls included in the first ball group BG1, the balls positioned at the outermost sides in the direction parallel to the optical axis (Z-axis) may respectively be in two-point contact with the first guide groove g1 and the second guide groove g2.

That is, among the plurality of balls included in the first ball group BG1, the balls positioned at the outermost sides in the direction parallel to the optical axis (Z-axis) may be in two-point contact with the first guide groove g1, and may be in two-point contact with the second guide groove g2.

The first ball group BG1, the first guide groove g1, and the second guide groove g2 may function as a main guide for guiding the movement of the lens module 100 in the optical axis (Z-axis) direction.

In addition, the third guide groove g3 and the fourth guide groove g4 may be disposed to face each other in the direction (e.g., second axis (Y-axis) direction) perpendicular to the optical axis (Z-axis) direction, and the second ball group BG2 may be disposed in a space between the third guide groove g3 and the fourth guide groove g4.

Among the plurality of balls included in the second ball group BG2, the balls positioned at the outermost sides in the direction parallel to the optical axis (Z-axis) may be in two-point contact with one of the third guide groove g3 and the fourth guide groove g4, and may be in one-point contact with the other one of the third guide groove g3 and the fourth guide groove g4.

For example, among the plurality of balls included in the second ball group BG2, the balls positioned at the outermost sides in the direction parallel to the optical axis (Z-axis) may be in one-point contact with the third guide groove g3 and may be in two-point contact with the fourth guide groove g4. Alternatively, the balls positioned at the outermost sides in the direction parallel to the optical axis (Z-axis) may be in two-point contact with the third guide groove g3 and may be in one-point contact with the fourth guide groove g4. The second ball group BG2, the third guide groove g3, and the fourth guide groove g4 may function as an auxiliary guide for guiding the movement of the lens module 100 in the optical axis (Z-axis) direction.

The first ball group BG1 and the second ball group BG2 may be spaced apart from each other in the direction (e.g., X-axis direction) perpendicular to the optical axis (Z-axis). The number of balls included in the first ball group BG1 and the number of balls included in the second ball group BG2 may be different from each other.

For example, the first ball group BG1 may include three or more balls arranged in the direction parallel to the optical axis (Z-axis), and the number of balls included in the second ball group BG2 may be smaller than the number of balls included in the first ball group BG1.

The number of balls included in each of the first and second ball groups BG1 ad BG2 may be changed as long as the number of balls included in the first ball group BG1 is different from the number of balls included in the second ball group BG2. Hereinafter, for convenience of description, the description describes an embodiment in which the first ball group BG1 includes three balls and the second ball group BG2 includes two balls.

Among the three balls included in the first ball group BG1, two balls disposed at the outermost sides in the direction parallel to the optical axis (Z-axis) may have the same diameter, and one ball disposed between the two balls disposed at the outermost sides may have a diameter smaller than the diameter of the two balls disposed at the outermost sides.

For example, among the plurality of balls included in the first ball group BG1, two balls disposed at the outermost sides in the direction parallel to the optical axis (Z-axis) may have a first diameter, and one ball disposed between the two balls disposed at the outermost sides may have a second diameter. The first diameter may be greater than the second diameter.

Two balls included in the second ball group BG2 may have the same diameter. For example, two balls included in the second ball group BG2 may have a third diameter.

In addition, the first diameter and the third diameter may be the same as each other. In this context, the same diameter may mean the same diameter including a manufacturing error as well as a physically same diameter.

A distance between centers of the balls disposed at the outermost sides in the direction parallel to the optical axis (Z-axis) among the plurality of balls included in the first ball group BG1 may be different from a distance between centers of the balls disposed at the outermost sides in the direction parallel to the optical axis (Z-axis) among the plurality of balls included in the second ball group BG2.

For example, a distance between the centers of the two balls each having the first diameter included in the first ball group BG1 may be greater than a distance between the centers of the two balls included in the second ball group BG2 each having the third diameter.

An action center point CP of the attractive force acting between the first magnet 510 and the first yoke 550 should be positioned within a support region A defined by connecting together contact points of the first ball group BG1 and the second ball group BG2 with the carrier 130 (or the AF housing 200) in order for the carrier 130 to be moved parallel to the optical axis (Z-axis) direction (that is, in order to prevent the carrier 130 from being tilted) when moved in the optical axis (Z-axis) direction.

If the action center point CP of the attractive force is outside the support region A, the carrier 130 may have a shifted position during its movement, which may cause a risk in which the carrier 130 is tilted. Therefore, it is necessary to make the support region A as wide as possible.

In an embodiment of the present disclosure, each size (e.g., diameter) of some of the plurality of balls included in the first ball unit B1 may be intentionally larger than each size (e.g., diameter) of the other balls. In this case, the larger balls among the plurality of balls may be intentionally brought into contact with the carrier 130 (or the AF housing 200).

Referring to FIG. 7, among three balls of the first ball group BG1, the diameters of two balls may be larger than the diameter of the other ball, and the two balls of the first ball group BG1 may each be in contact with the carrier 130 or the AF housing 200. In addition, two balls of the second ball group BG2 may have the same diameter, and the two balls of the second ball group BG2 may each be in contact with the carrier 130 or the AF housing 200.

Accordingly, as shown in FIG. 7, when viewed in the second axis (Y-axis) direction, the first ball group BG1 and the second ball group BG2 may be in four-point contact with the AF housing 200 (or the carrier 130). In addition, the support region A defined by connecting together the contact points may have a trapezoidal shape.

Therefore, the support region A may be made wider, and the action center point CP of the attractive force acting between the first magnet 510 and the first yoke 550 may thus be stably positioned within the support region A. It is thus possible to secure a driving stability of the camera module during the autofocusing.

However, even when the two balls of the second ball group BG2 are manufactured to have the same diameter, the two balls of the second ball group BG2 may not physically have exactly the same diameter due to a manufacturing error, In this case, only one of the two balls of the second ball group BG2 may be in contact with the AF housing 200 (or the carrier 130).

Accordingly, the support region A defined by connecting together the contact points of the first ball group BG1 and the second ball group BG2 with the carrier 130 (or the AF housing 200) may have a triangular shape.

Even when the support region A has the triangular shape, the support region A may be made wider by the balls positioned at the outermost sides in the direction parallel to the optical axis (Z-axis) among the three balls of the first ball group BG1, thereby securing the driving stability of the camera module during the autofocusing.

Apart from securing the driving stability during the auto-focusing, it may also be important for the camera module 1 to have a smaller height (or to be made slim) in the optical axis (Z-axis) direction. When the camera module 1 simply has the smaller height in the optical axis (Z-axis) direction, the support region A may also have a smaller height in the optical axis (Z-axis) direction.

That is, when the camera module 1 simply has the smaller height in the optical axis (Z-axis) direction, there is a risk that a problem may occur in the driving stability of the camera module during the autofocusing.

Accordingly, in the camera module 1 according to an embodiment of the present disclosure, lengths of the first guide groove part G1 and the second guide groove part G2 in the optical axis (Z-axis) direction may be different from each other. For example, the length of the first guide groove part G1 in the optical axis (Z-axis) direction may be longer than the length of the second guide groove part G2 in the optical axis (Z-axis) direction.

Referring to FIG. 7, protrusion parts protruding toward the first ball group BG1 and the second ball group BG2 may be disposed on the second guide part 230 of the AF housing 200. The protrusion parts may include a first protrusion part 231 protruding toward the first ball group BG1 in the optical axis (Z-axis) direction and a second protrusion part 233 protruding toward the second ball group BG2 in the optical axis (Z-axis) direction.

The first protrusion part 231 and the second protrusion part 233 may protrude from a bottom surface of the second guide part 230 of the AF housing 200 in the optical axis (Z-axis) direction. Lengths of the first protrusion part 231 and the second protrusion part 233 in the optical axis (Z-axis) direction may be different from each other. For example, the length of the second protrusion part 233 in the optical axis (Z-axis) direction may be longer than a length of the first protrusion part 231 in the optical axis (Z-axis) direction.

Accordingly, the second guide groove g2 and the fourth guide groove g4 formed in the second guide part 230 of the AF housing 200 by the first protrusion part 231 and the second protrusion part 233 may have lengths in the optical axis (Z-axis) direction that are different from each other. For example, the length of the second guide groove g2 in which the first ball group BG1 is disposed in the optical axis (Z-axis) direction may be longer than the length of the fourth guide groove g4 in which the second ball group BG2 is disposed in the optical axis (Z-axis) direction.

Among the main guide and the auxiliary guide, the length of the first guide groove part G1 corresponding to the main guide may be longer than the length of the second guide groove part G2 corresponding to the auxiliary guide, and the camera module 1 may thus have a smaller size while the support region A has a greater height in the optical axis (Z-axis) direction.

Through this configuration, the camera module 1 may achieve its slimness by having a smaller height in the optical axis (Z-axis) direction while securing the driving stability during the autofocusing.

Referring to FIG. 2, in an embodiment, a sub-yoke 590 may be disposed to face the first magnet 510. The sub-yoke 590 may be fixed to the AF housing 200. For example, the sub-yoke 590 may be disposed on the AF substrate 810 to face the first magnet 510.

The first coil 530 and the sub-yoke 590 may be disposed on one surface of the AF substrate 810, and the first yoke 550 may be disposed on the other surface of the AF substrate 810.

For another example, a guide hole passing through the AF substrate 810 may be formed in the AF substrate 810, and the sub-yoke 590 may be disposed in this guide hole to face the first magnet 510. In this case, the sub-yoke 590 may be mounted on the first yoke 550 to face the first magnet 510 through the guide hole.

The sub-yoke 590 may be positioned closer to the main guide than the auxiliary guide. For example, the sub-yoke 590 may be positioned closer to the first ball group BG1 (i.e., closer to the ball group including more balls) than the second ball group BG2.

The sub-yoke 590 may be made of a material that may generate an attractive force with the first magnet 510.

Accordingly, a resultant force of the attractive force acting between the first magnet 510 and the first yoke 550 and the attractive force acting between the first magnet 510 and the sub-yoke 590 may be positioned closer to the main guide than the auxiliary guide.

The support region A may have a greater height in the optical axis (Z-axis) direction closer to the main guide, and it is thus possible to more stably position the action center point CP of the attractive force within the support region A.

A buffer member may be disposed on either one or both of the surfaces of the carrier 130 and the AF housing 200 facing each other in the direction parallel to the optical axis (Z-axis). The carrier 130 may be moved relative to the AF housing 200, and accordingly, there is a risk that the surfaces of the carrier 130 and the AF housing 200 facing each other in the direction parallel to the optical axis (Z-axis) may collide with each other during the movement of the carrier 130. However, impact and noise from such a collision may be alleviated by disposing the buffer member having elasticity on either one or both of the surfaces of the carrier 130 and the AF housing 200 facing each other in the direction parallel to the optical axis (Z-axis).

In addition, a buffer member may be disposed on either one or both of the surfaces of the carrier 130 and the case 930 facing each other in the direction parallel to the optical axis (Z-axis). The carrier 130 may be moved relative to the case 930, and accordingly, there is a risk that the surfaces of the carrier 130 and the case 930 facing each other in the direction parallel to the optical axis (Z-axis) may collide with each other during the movement of the carrier 130. However, the impact and noise from such a collision may be alleviated by disposing the buffer member having the elasticity on either one or both of the surfaces of the carrier 130 and the case 930 facing each other in the direction parallel to the optical axis (Z-axis).

The camera module 1 according to an embodiment of the present disclosure may detect position of the carrier 130 in the optical axis (Z-axis) direction.

To this end, a first position sensor 570 may be provided. The first position sensor 570 may be disposed on the AF substrate 810 to face the first magnet 510. The first position sensor 570 may be a Hall sensor.

Figure 8:
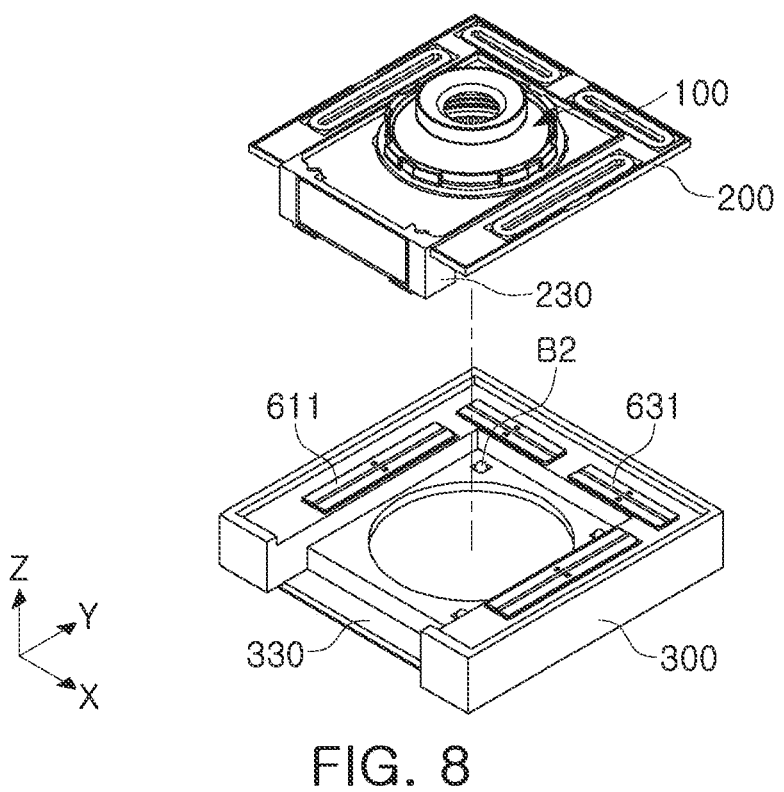
FIG. 8 is an exploded perspective view of the AF housing and an optical image stabilization (OIS) housing in the camera module according to an embodiment of the present disclosure.
Figure 9:
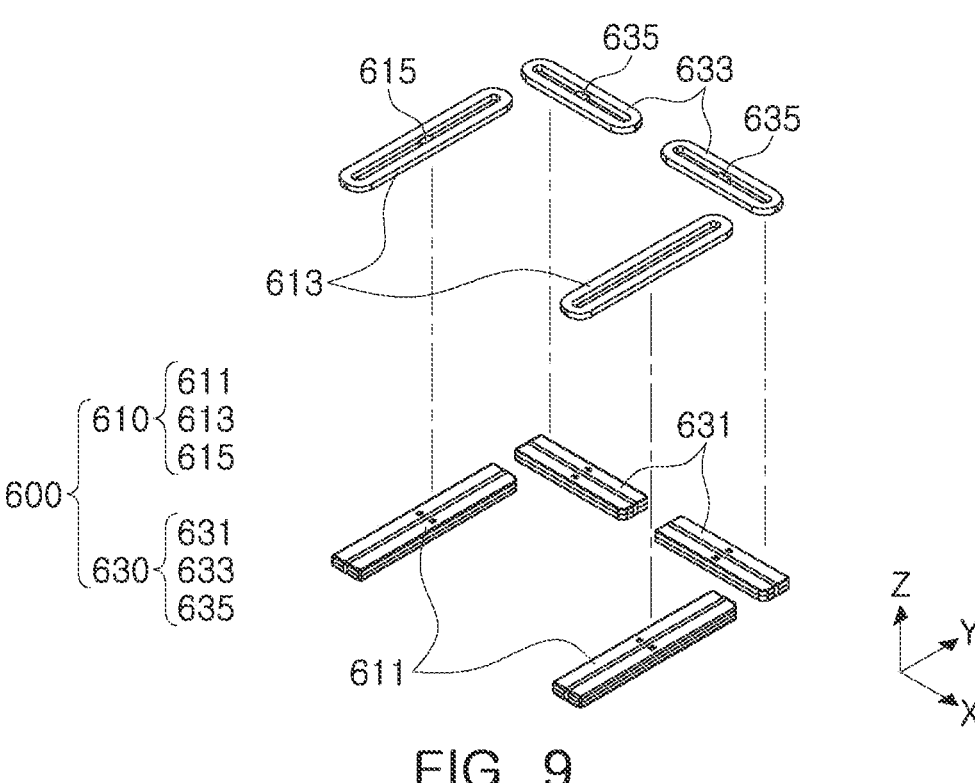
FIG. 9 is an exploded perspective view of a second driving portion.
Figure 10:
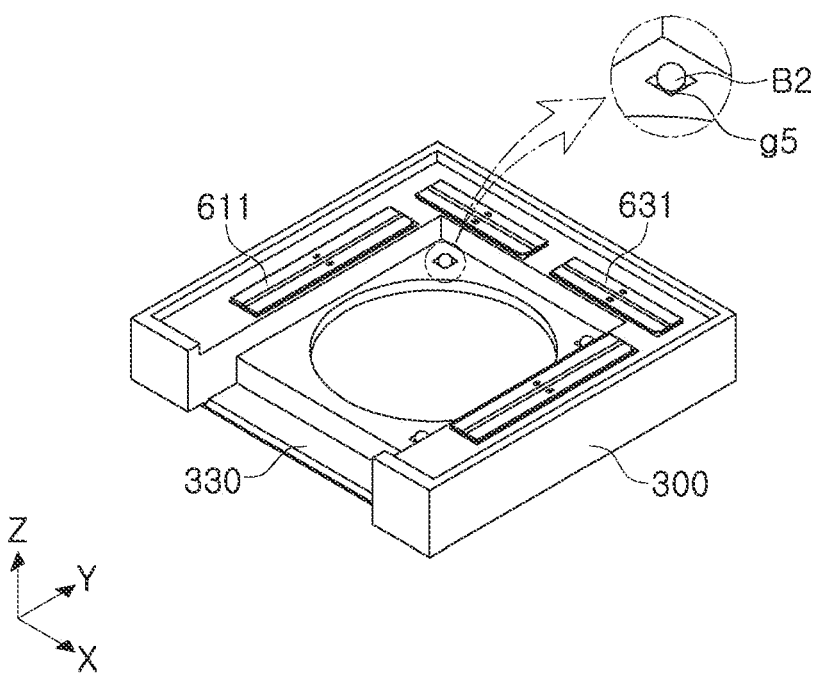
FIG. 10 is a perspective view of the OIS housing and an enlarged view of a fifth guide groove and a second ball unit.

FIG. 8 is an exploded perspective view of the AF housing and an optical image stabilization (OIS) housing in the camera module according to an embodiment of the present disclosure. FIG. 9 is an exploded perspective view of a second driving portion. FIG. 10 is a perspective view of the OIS housing and an enlarged view of a fifth guide groove and a second ball unit.

First, referring to FIG. 8, the carrier 130 may be accommodated in the AF housing 200, and the AF housing 200 may be disposed in the OIS housing 300.

The OIS housing 300 may include a body part 310 (see FIG. 2) in which the lens module 100 is accommodated.

The first guide part 131 of the carrier 130 and the second guide part 230 of the AF housing 200 may each protrude farther in the optical axis (Z-axis) direction than the other portions of the carrier 130 and the second guide part 230, and accordingly an accommodation space may be provided in the OIS housing 300 to secure an installation for the first guide part 131 and the second guide part 230.

That is, as shown in FIG. 8, a stepped part 330 may be provided on one side of the OIS housing 300 to provide an accommodation space where the second guide part 230 is disposed.

The installation space for the first guide part 131 and the second guide part 230 may be secured by the stepped part 330.

Therefore, protrusions may be disposed in the OIS housing 300 even when the first guide part 131 of the carrier 130 and the second guide part 230 of the AF housing 200 protrude in the optical axis (Z-axis) direction. As a result, the overall height of the camera module 1 may not be increased.

The AF housing 200 may be disposed in the OIS housing 300 and may be moved relative to the OIS housing 300 on the plane perpendicular to the optical axis (Z-axis).

The lens module 100 may be disposed in the AF housing 200, and the lens module 100 may thus also be moved on the plane perpendicular to the optical axis (Z-axis) as the AF housing 200 is moved. Therefore, the lens module 100 may be moved on the plane perpendicular to the optical axis (Z-axis) to perform the optical image stabilization during capturing an image.

The second driving portion 600 may generate a driving force in the direction perpendicular to the optical axis (Z-axis) to move the AF housing 200 in the direction perpendicular to the optical axis (Z-axis) or rotate the AF housing 200 about the optical axis (Z-axis) or any axis parallel to the optical axis (Z-axis) as its rotation axis.

The second driving portion 600 may include a first sub-driving portion 610 and a second sub-driving portion 630. The first sub-driving portion 610 may generate a driving force in the first axis (X-axis) direction, and the second sub-driving portion 630 may generate a driving force in the second axis (Y-axis) direction.

The first sub-driving portion 610 may include a second magnet 611 and a second coil 613. The second magnet 611 and the second coil 613 may be disposed to face each other in the optical axis (Z-axis) direction.

The second magnet 611 may be disposed in the OIS housing 300. The second magnet 611 may include a plurality of magnets. For example, the second magnet 611 may include two magnets, and the two magnets may be symmetrically spaced apart from each other with respect to the optical axis (Z-axis).

For example, the second magnet 611 may include the two magnets spaced apart from each other in the direction (e.g., first axis (X-axis) direction) in which a driving force is generated by the second magnet 611.

A mounting groove 350 (see FIG. 2) in which the second magnet 611 is disposed may be formed in an upper surface of the OIS housing 300. The second magnet 611 may be inserted into the mounting groove 350, thereby preventing an increase in the overall height of the camera module 1 due to a thickness of the second magnet 611.

The second magnet 611 may be magnetized so that one surface (e.g., a surface facing the second coil 613) thereof has both an N pole and an S pole. For example, the N pole, a neutral region, and the S pole may be sequentially positioned in the first axis (X-axis) direction on the one surface of the second magnet 611 facing the second coil 613. The second magnet 611 may be elongated in the second axis (Y-axis) direction.

The other surface (e.g., another surface opposite to the one surface) of the second magnet 611 may be magnetized to have both an S pole and an N pole. For example, the S pole, a neutral region, and the N pole may be sequentially positioned on the other surface of the second magnet 611 in the first axis (X-axis) direction so that the S pole on the other surface opposes the N pole on the one surface, and the N pole on the other surface opposes the S pole on the one surface.

The second coil 613 may be disposed to face the second magnet 611. For example, the second coil 613 may be disposed to face the second magnet 611 in the optical axis (Z-axis) direction.

The section coil 613 may have a hollow donut shape, and may be elongated in the second axis (Y-axis) direction. The second coil 613 may include a number of coils corresponding to the number of magnets included in the second magnet 611.

The second coil 613 may be disposed on a first optical image stabilization (OIS) substrate 830. The first OIS substrate 830 may be a component of the sensor substrate 800 described below. A portion of the first OIS substrate 830 may be mounted in the AF housing 200 so that the second magnet 611 and the second coil 613 face each other in the optical axis (Z-axis) direction, and the other portion of the first OIS substrate 830 may be mounted in the OIS housing 300 or the case 930.

The AF housing 200 may include a body part 210 in which the lens module 100 is accommodated, and a flange part 250 extending from the body part 210 in the direction perpendicular to the optical axis (Z-axis).

The AF housing 200 may include a through-hole 251. For example, the through-hole 251 may pass through the flange part 250 of the AF housing 200 in the optical axis (Z-axis) direction. The second coil 613 may be disposed in the through-hole 251 of the AF housing 200, thereby preventing the increase in the overall height of the camera module 1 due to a thickness of the second coil 613.

An upper portion of the through-hole 251 in the AF housing 200 may be covered by the first OIS substrate 830.

During the optical image stabilization, the second magnet 611 may be a fixed member fixed to the OIS housing 300, and the second coil 613 may be a moving member mounted on the first OIS substrate 830 and the AF housing 200 to be moved together with the AF housing 200.

When the power is applied to the second coil 613, the AF housing 200 may be moved in the first axis (X-axis) direction by an electromagnetic force generated between the second magnet 611 and the second coil 613.

The second magnet 611 and the second coil 613 may generate a driving force in the direction (e.g., first axis (X-axis) direction) perpendicular to a direction (or optical axis direction) in which the second magnet 611 and the second coil 613 face each other.

The second sub-driving portion 630 may include a third magnet 631 and a third coil 633. The third magnet 631 and the third coil 633 may be disposed to face each other in the optical axis (Z-axis) direction.

The third magnet 631 may be disposed in the OIS housing 300. The third magnet 631 may include a plurality of magnets. For example, the third magnet 631 may include two magnets, and the two magnets may be spaced apart from each other in the first axis (X-axis) direction.

For example, the third magnet 631 may include the two magnets spaced apart from each other in the direction (e.g., first axis (X-axis) direction) perpendicular to a direction in which a driving force is generated by the third magnet 631.

A mounting groove 350 in which the third magnet 631 is disposed may be formed in the upper surface of the OIS housing 300. The third magnet 631 may be inserted into the mounting groove 350, thereby preventing the increase in the overall height of the camera module 1 due to a thickness of the third magnet 631.

The third magnet 631 may be magnetized so that one surface (e.g., a surface facing the third coil 633) thereof has both an S pole and an N pole. For example, the S pole, a neutral region, and the N pole may be sequentially positioned in the second axis (Y-axis) direction on the one surface of the second magnet 631 facing the third coil 633. The third magnet 631 may be elongated in the first axis (X-axis) direction.

The other surface (e.g., another surface opposite to the one surface) of the third magnet 631 may be magnetized to have both an N pole and an S pole. For example, the N pole, a neutral region, and the S pole may be sequentially positioned on the other surface of the third magnet 631 in the second axis (Y-axis) direction so that the N pole on the other surface opposes the S pole on the one surface, and the S pole on the other surface opposes the N pole on the one surface.

The third coil 633 may be disposed to face the third magnet 631. For example, the third coil 633 may be disposed to face the third magnet 631 in the optical axis (Z-axis) direction.

The third coil 633 may have a hollow donut shape, and may be elongated in the first axis (X-axis) direction. The third coil 633 may include a number of coils corresponding to the number of magnets included in the third magnet 631.

The third coil 633 may be disposed on the first OIS substrate 830. The first OIS substrate 830 may be a component of the sensor substrate 800 described below. A portion of the first OIS substrate 830 may be mounted in the AF housing 200 so that the third magnet 631 and the third coil 633 face each other in the optical axis (Z-axis) direction, and the other portion of the first OIS substrate 830 may be mounted in the OIS housing 300 or the case 930.

The AF housing 200 may include a through-hole 251. For example, the through-hole 251 may pass through the flange part 250 of the AF housing 200 in the optical axis (Z-axis) direction. The third coil 633 may be disposed in the through-hole 251 of the AF housing 200, thereby preventing the increase in the overall height of the camera module 1 due to a thickness of the third coil 633.

An upper portion of the through-hole 251 in the AF housing 200 may be covered by the first OIS substrate 830.

During the optical image stabilization, the third magnet 631 may be a fixed member fixed to the OIS housing 300, and the third coil 633 may be a moving member mounted on the first OIS substrate 830 and the AF housing 200 to be moved together with the AF housing 200.

When the power is applied to the third coil 633, the AF housing 200 may be moved in the second optical axis (Y-axis) direction by an electromagnetic force generated between the third magnet 631 and the third coil 633.

The third magnet 631 and the third coil 633 may generate a driving force in the direction (e.g., second axis (Y-axis) direction) perpendicular to the direction (or optical axis direction) in which the third magnet 631 and the third coil 633 face each other.

The AF housing 200 may be rotated about the optical axis (Z-axis) or any axis parallel to the optical axis (Z-axis) by the first sub-driving portion 610 and the second sub-driving portion 630.

The second magnet 611 and the third magnet 631 may be disposed perpendicular to each other on a plane perpendicular to the optical axis (Z-axis), and the second coil 613 and the third coil 633 may also be disposed perpendicular to each other on a plane perpendicular to the optical axis (Z-axis).

The second coil 613 and the third coil 633 may be moved together with the AF housing 200 during the optical image stabilization, and the first OIS substrate 830 on which the second coil 613 and the third coil 633 are mounted may thus support the movements of the second coil 613 and the third coil 633. This configuration is described below with reference to FIGS. 18 through 20.

A second ball unit B2 may be disposed between the AF housing 200 and the OIS housing 300.

The second ball unit B2 may be disposed to be in contact with each of the AF housing 200 and the OIS housing 300.

The second ball unit B2 may function to guide the movement of the AF housing 200 during the optical image stabilization process. The second ball unit B2 may also function to maintain a gap between the AF housing 200 and the OIS housing 300.

The second ball unit B2 may roll in the first axis (X-axis) direction when a driving force is generated in the first axis (X-axis) direction. Therefore, the second ball unit B2 may guide the movement of the AF housing 200 in the first axis (X-axis) direction.

In addition, the second ball unit B2 may roll in the second axis (Y-axis) direction when a driving force is generated in the second axis (Y-axis) direction. Therefore, the second ball unit B2 may guide the movement of the AF housing 200 in the second axis (Y-axis) direction.

The second ball unit B2 may include a plurality of balls disposed between the OIS housing 300 and the moving frame 400.

Referring to FIGS. 8 and 10, fifth guide grooves g5 in which the second ball unit B2 is disposed may be formed in either one or both of the surfaces of the AF housing 200 and the OIS housing 300 facing each other in the optical axis (Z-axis) direction. A number of the fifth guide grooves g5 may correspond to a number of the plurality of balls included in the second ball unit B2.

For example, the fifth guide grooves g5 may be formed in either one or both of a lower surface of the AF housing 200 and an upper surface of the OIS housing 300.

The second ball unit B2 may be disposed in the fifth guide grooves g5 and fitted between the AF housing 200 and the OIS housing 300.

The fifth guide grooves g5 may have a polygonal or circular shape. A size of the fifth guide grooves g5 may be larger than a diameter of the plurality of balls included in the second ball unit B2. For example, a cross section of the fifth guide grooves g5 may have a size larger than the diameter of the plurality of balls included in the second ball unit B2 on a plane perpendicular to the optical axis (Z-axis).

A specific shape of the fifth guide grooves g5 is not limited as long as their size is larger than the diameter of the plurality of balls included in the second ball unit B2.

Accordingly, the plurality of balls included in the second ball unit B2 may roll in the direction perpendicular to the optical axis (Z-axis) while being accommodated in the fifth guide grooves g5.

Support pads may disposed in the AF housing 200 and the OIS housing 300, and at least a portion of the support pad disposed in the OIS housing 300 may form a bottom surface of the fifth guide grooves g5. Accordingly, the plurality of balls included in the second ball unit B2 may roll in contact with the support pad.

The support pads may be integrally coupled with the AF housing 200 and the OIS housing 300 by insert injection molding. In this case, the support pads may be integrated with the AF housing 200 and the OIS housing 300 by injecting a resin material into a mold while the support pads are fixed in the mold.

The support pads may be made of stainless steel.

The AF housing 200 may be moved in the first axis (X-axis) direction when a driving force is generated in the first axis (X-axis) direction, and the AF housing 200 may be moved in the second axis (Y-axis) direction when a driving force is generated in the second axis (Y-axis) direction.

In addition, the AF housing 200 may be rotated about the optical axis (Z-axis) or any axis parallel to the optical axis (Z-axis) by generating a deviation in either one or both of a magnitude of a driving force generated in the first axis (X-axis) direction and a magnitude of a driving force generated in the second axis (Y-axis) direction.

The camera module 1 according to an embodiment of the present disclosure may detect a position of the AF housing 200 in the direction perpendicular to the optical axis (Z-axis).

To this end, a second position sensor 615 and a third position sensor 635 may be provided. The second position sensor 615 may be disposed on the first OIS substrate 830 to face the second magnet 611, and the third position sensor 635 may be disposed on the first OIS substrate 830 to face the third magnet 631. The second position sensor 615 and the third position sensor 635 may be Hall sensors.

The third position sensor 635 may include two Hall sensors. For example, the third magnet 631 may include two magnets spaced apart from each other in a direction (e.g., first axis (X-axis) direction) perpendicular to a direction (e.g., second axis (Y-axis) direction) in which a driving force is generated by the third magnet 631, and the third position sensor 635 may include the two Hall sensors facing the two magnets.

It is possible to detect whether the AF housing 200 is rotated through the two Hall sensors facing the two magnets of the third magnet 631.

A rotational force may be intentionally generated by using a deviation generated in the driving force of the first sub-driving portion 610 and the driving force of the second sub-driving portion 630, the resultant force of the first sub-driving portion 610 and the second sub-driving portion 630, two magnets included in the second sub-driving portion 630, or any other suitable technique.

The fifth guide grooves g5 may have polygonal or circular shape having a size that is larger than the diameter of the plurality of balls included in the second ball unit B2, and the plurality of balls included in the second ball unit B2 disposed in the fifth guide grooves g5 may roll without limitation in the direction perpendicular to the optical axis (Z-axis).

Accordingly, the AF housing 200 may be rotated about the optical axis (Z-axis) or any axis parallel to the optical axis (Z-axis) while being supported by the second ball unit B2.

In addition, when the camera module needs a linear movement without rotation, an unintentionally generated rotational force may be offset by controlling the driving force of the first sub-driving portion 610 and/or the driving force of the second sub-driving portion 630.

A second yoke and a third yoke (not shown) may be disposed in the AF housing 200. The second yoke and the third yoke may provide an attractive force so that the AF housing 200 and the OIS housing 300 remain in contact with the second ball unit B2.

The second yoke and the third yoke may be fixed to the AF housing 200. For example, the second yoke and the third yoke may be disposed on the first OIS substrate 830, and the first OIS substrate 830 may be coupled to the AF housing 200.

The second coil 613 and the third coil 633 may be disposed on one surface of the first OIS substrate 830, and the second yoke and the third yoke may be disposed on the other surface of the first OIS substrate 830.

The second yoke may be disposed to face the second magnet 611 in the optical axis (Z-axis) direction, and the third yoke may be disposed to face the third magnet 631 in the optical axis (Z-axis) direction.

The attractive forces may respectively act between the second yoke and the second magnet 611 and between the third yoke and the third magnet 631 in the optical axis (Z-axis) direction.

Accordingly, the AF housing 200 may be pressed toward the OIS housing 300, and the AF housing 200 and the OIS housing 300 may thus remain in contact with the second ball unit B2.

The second yoke and the third yoke may each be made of a material which may generate the attractive force between the second magnet 611 and the third magnet 631. For example, the second yoke and the third yoke may each be made of a magnetic material.

Figure 11:
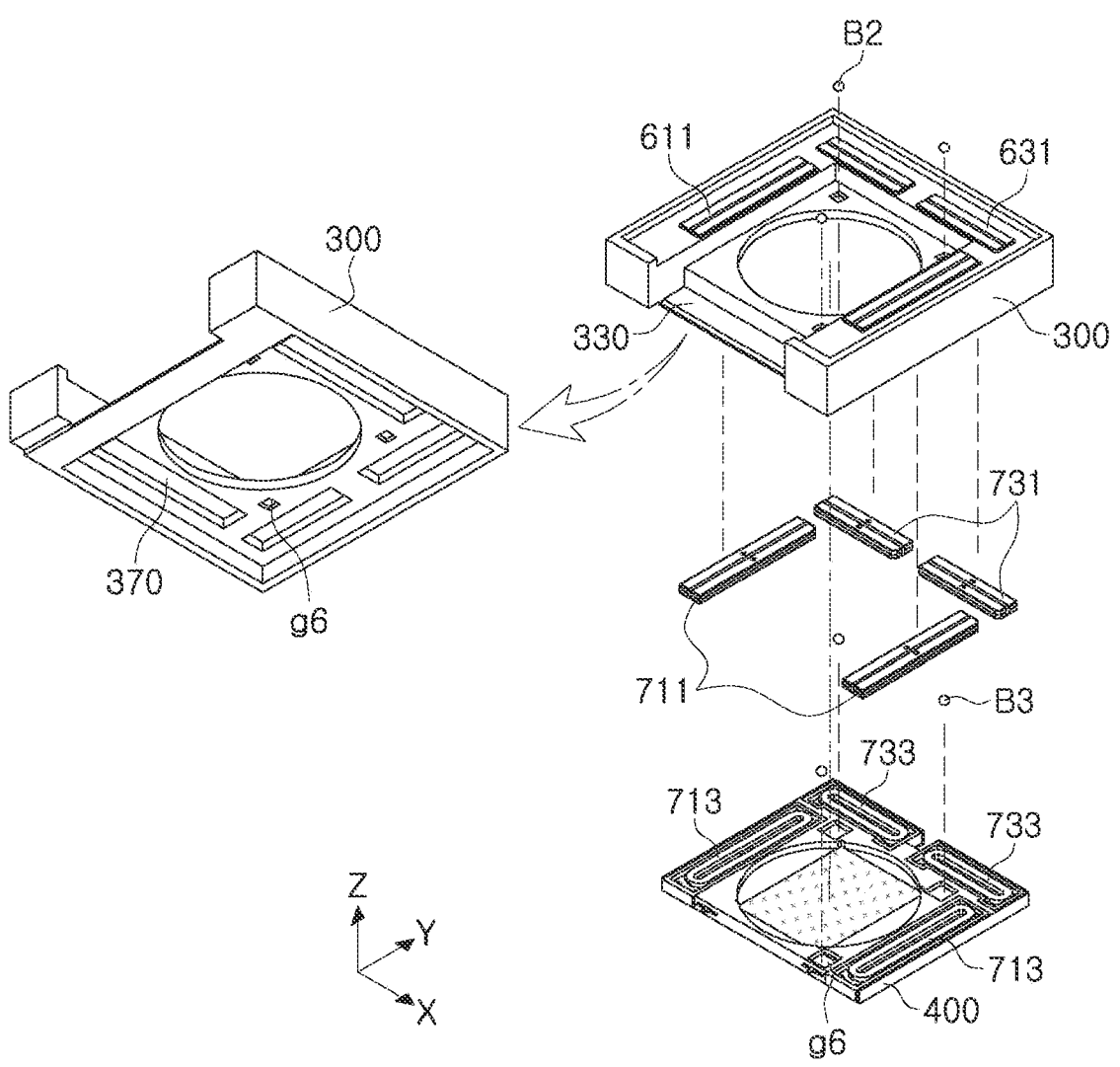
FIG. 11 is an exploded perspective view of the OIS housing and a moving frame in the camera module according to an embodiment of the present disclosure.
Figure 12:
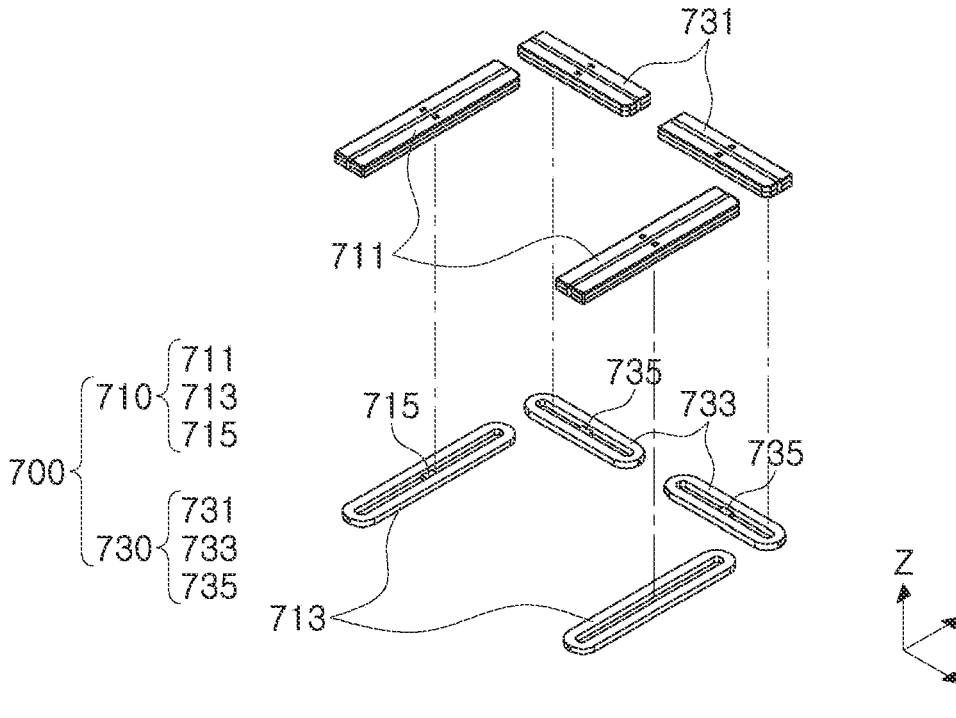
FIG. 12 is an exploded perspective view of a third driving portion.
Figure 13:
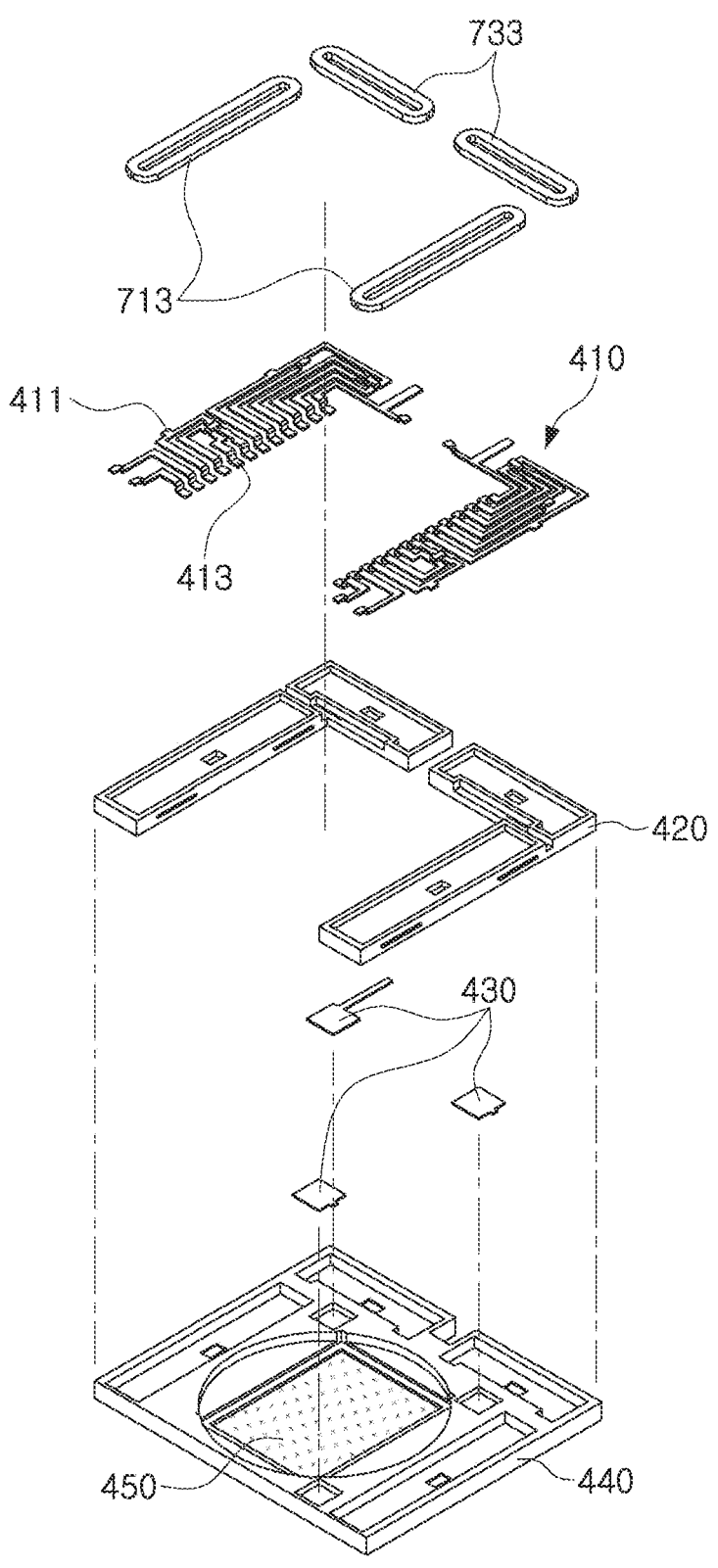
FIG. 13 is an exploded perspective view of the moving frame.
Figure 14:
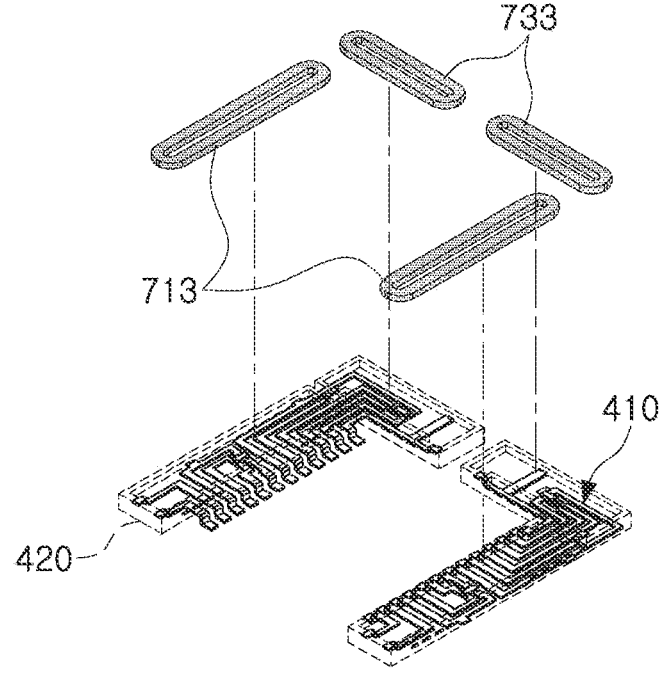
FIGS. 14 and 15 are partially exploded perspective views of the moving frame.
Figure 15:
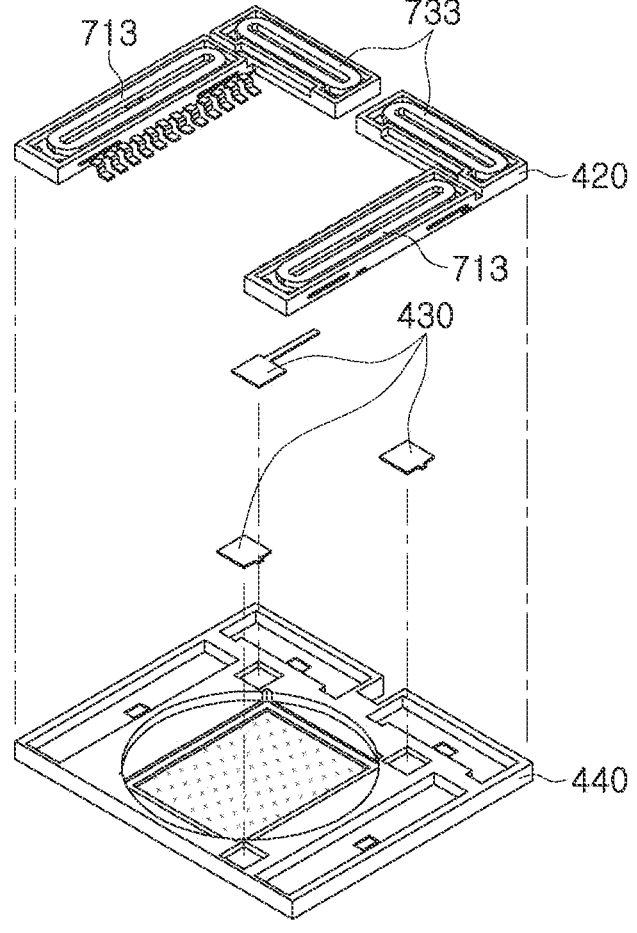

FIG. 11 is an exploded perspective view of the OIS housing and a moving frame in the camera module according to an embodiment of the present disclosure. FIG. 12 is an exploded perspective view of a third driving portion. FIG. 13 is an exploded perspective view of the moving frame. FIGS. 14 and 15 are partially exploded perspective views of the moving frame.

Figure 16:
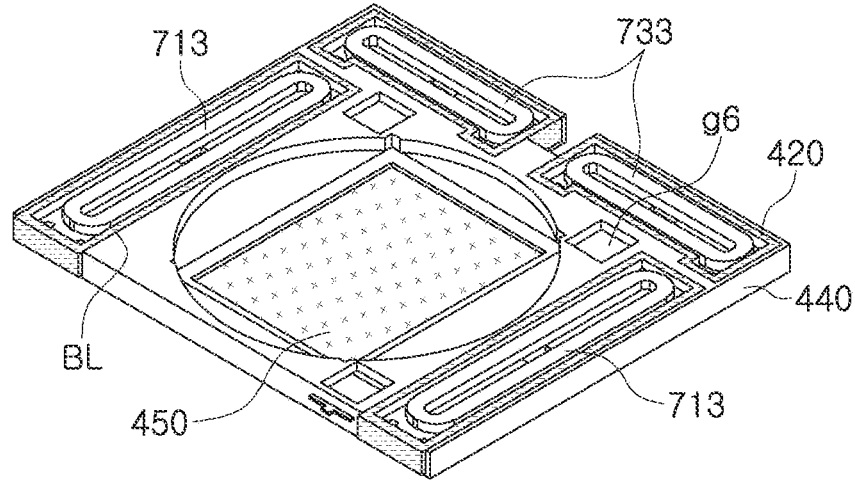
FIG. 16 is a perspective view of the moving frame.
Figure 17:
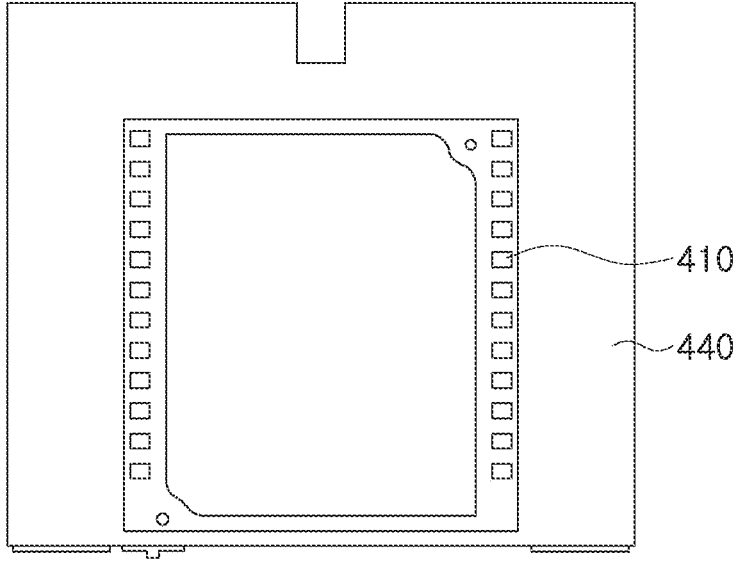
FIG. 17 is a bottom view of the moving frame.

FIG. 16 is a perspective view of the moving frame. FIG. 17 is a bottom view of the moving frame.

First, referring to FIG. 11, the moving frame 400 may be accommodated in the OIS housing 300. The OIS housing 300 may have a sidewall extending downward in the optical axis (Z-axis) direction, and thus have an accommodation space for accommodating the moving frame 400.

The AF housing 200 may be disposed on one side of the OIS housing 300 in the optical axis (Z-axis) direction, and the moving frame 400 may be disposed on the other side of the OIS housing 300 in the optical axis (Z-axis) direction.

The moving frame 400 may be moved relative to the OIS housing 300 in the direction perpendicular to the optical axis (Z-axis) or rotated about the optical axis (Z-axis) or any axis parallel to the optical axis (Z-axis) as its rotation axis. That is, the moving frame 400 may be the moving member moved during the optical image stabilization.

For example, the moving frame 400 may be moved in the first axis (X-axis) direction or the second axis (Y-axis) direction, and rotated about the optical axis (Z-axis) or any axis parallel to the optical axis (Z-axis) as its rotation axis.

The moving frame 400 may have a rectangular plate shape with a center open in the optical axis (Z-axis) direction.

An infrared cut filter 450 may be mounted on an upper surface of the moving frame 400. The sensor substrate 800 may be mounted on a lower surface of the moving frame 400.

A third ball unit B3 may be disposed between the OIS housing 300 and the moving frame 400.

The third ball unit B3 may be disposed to be in contact with each of the OIS housing 300 and the moving frame 400.

When the moving frame 400 is moved or rotated relative to the OIS housing 300, the third ball unit B3 may roll between the OIS housing 300 and the moving frame 400 to support the movement of the moving frame 400.

Referring to FIG. 2, the image sensor S may be mounted on the sensor substrate 800. A portion of the sensor substrate 800 may be coupled to the moving frame 400, and the other portion of the sensor substrate 800 may be coupled to the OIS housing 300.

The image sensor S may be mounted on a portion of the sensor substrate 800 coupled to the moving frame 400.

A portion of the sensor substrate 800 may be coupled to the moving frame 400, and a portion of the sensor substrate 800 may thus also be moved or rotated together with the moving frame 400 as the moving frame 400 is moved or rotated.

Therefore, the image sensor S may be moved or rotated on the plane perpendicular to the optical axis (Z-axis) to perform the optical image stabilization during capturing an image.

The third driving portion 700 may generate a driving force in the direction perpendicular to the optical axis (Z-axis) to move the moving frame 400 in the direction perpendicular to the optical axis (Z-axis) or rotate the moving frame 400 about the optical axis (Z-axis) or any axis parallel to the optical axis (Z-axis) as its rotation axis.

The third driving portion 700 may include a third sub-driving portion 710 and a fourth sub-driving portion 730. The third sub-driving portion 710 may generate a driving force in the first axis (X-axis) direction, and the fourth sub-driving portion 730 may generate a driving force in the second axis (Y-axis) direction.

The third sub-driving portion 710 may include a fourth magnet 711 and a fourth coil 713. The fourth magnet 711 and the fourth coil 713 may be disposed to face each other in the optical axis (Z-axis) direction.

The fourth magnet 711 may be disposed in the OIS housing 300. The fourth magnet 711 may include a plurality of magnets. For example, the fourth magnet 711 may include two magnets, and the two magnets may be symmetrically spaced apart from each other with respect to the optical axis (Z-axis).

For example, the fourth magnet 711 may include the two magnets spaced apart from each other in the direction (i.e., first axis (or X-axis) direction) in which a driving force is generated by the fourth magnet 711.

A mounting groove 370 in which the fourth magnet 711 is disposed may be formed in a lower surface of the OIS housing 300. The fourth magnet 711 may be inserted into the mounting groove 370, thereby preventing the increase in the overall height of the camera module 1 due to a thickness of the fourth magnet 711.

The fourth magnet 711 may be magnetized so that one surface (e.g., a surface facing the fourth coil 713) thereof has both an N pole and an S pole. For example, the N pole, a neutral region, and the S pole may be sequentially positioned in the first axis (X-axis) direction on the one surface of the fourth magnet 711 facing the fourth coil 713. The fourth magnet 711 may be elongated in the second axis (Y-axis) direction.

The other surface (e.g., another surface opposite to the one surface) of the fourth magnet 711 may be magnetized to have both an S pole and an N pole. For example, the S pole, a neutral region, and the N pole may be sequentially positioned on the other surface of the fourth magnet 711 in the first axis (X-axis) direction so that the S pole on the other surface opposes the N pole on the one surface, and the N pole on the other surface opposes the S pole on the one surface.

The fourth coil 713 may be disposed to face the fourth magnet 711. For example, the fourth coil 713 may be disposed to face the fourth magnet 711 in the optical axis (Z-axis) direction.

The fourth coil 713 may have a hollow donut shape, and may be elongated in the second axis (Y-axis) direction. The fourth coil 713 may include a number of coils corresponding to the number of magnets included in the fourth magnet 711.

The fourth coil 713 may be mounted in the moving frame 400.

During the optical image stabilization, the fourth magnet 711 may be a fixed member fixed to the OIS housing 300, and the fourth coil 713 may be a moving member mounted in the moving frame 400 and moved together with the moving frame 400.

When the power is applied to the fourth coil 713, the moving frame 400 may be moved in the first axis (X-axis) direction by an electromagnetic force generated between the fourth magnet 711 and the fourth coil 713.

The fourth magnet 711 and the fourth coil 713 may generate a driving force in the direction (e.g., first axis (X-axis) direction) perpendicular to a direction (or optical axis direction) in which the fourth magnet 711 and the fourth coil face each other.

The fourth sub-driving portion 730 may include a fifth magnet 731 and a fifth coil 733. The fifth magnet 731 and the fifth coil 733 may be disposed to face each other in the optical axis (Z-axis) direction.

The fifth magnet 731 may be disposed in the OIS housing 300. The fifth magnet 731 may include a plurality of magnets. For example, the fifth magnet 731 may include two magnets, and the two magnets may be spaced apart from each other in the first axis (X-axis) direction.

For example, the fifth magnet 731 may include the two magnets spaced apart from each other in the direction (e.g., first axis (X-axis direction) perpendicular to a direction in which a driving force is generated by the fifth magnet 731.

A mounting groove 370 in which the fifth magnet 731 is disposed may be formed in the lower surface of the OIS housing 300. The fifth magnet 731 may be inserted into the mounting groove 370, thereby preventing the increase in the overall height of the camera module 1 due to a thickness of the fifth magnet 731.

The fifth magnet 731 may be magnetized so that one surface (e.g., a surface facing the fifth coil 733) thereof has both an S pole and an N pole. For example, the S pole, a neutral region, and the N pole may be sequentially positioned in the second axis (Y-axis) direction on the one surface of the fifth magnet 731 facing the fifth coil 733. The fifth magnet 731 may be elongated in the first axis (X-axis) direction.

The other surface (e.g., another surface opposite to the one surface) of the fifth magnet 731 may be magnetized to have both an N pole and an S pole. For example, the N pole, a neutral region, and the S pole may be sequentially positioned on the other surface of the fifth magnet 731 in the second axis (Y-axis) direction so that the N pole on the other surface opposes the S pole on the one surface, and the S pole on the other surface opposes the N pole on the one surface.

The fifth coil 733 may be disposed to face the fifth magnet 731. For example, the fifth coil 733 may be disposed to face the fifth magnet 731 in the optical axis (Z-axis) direction.

The fifth coil 733 may have a hollow donut shape, and may be elongated in the first axis (X-axis) direction. The fifth coil 733 may include a number of coils corresponding to the number of magnets included in the fifth magnet 731.

The fifth coil 733 may be mounted in the moving frame 400.

During the optical image stabilization, the fifth magnet 731 may be a fixed member fixed to the OIS housing 300, and the fifth coil 733 may be a moving member mounted in the moving frame 400 and moved together with the moving frame 400.

When the power is applied to the fifth coil 733, the moving frame 400 may be moved in the second optical axis (Y-axis) direction by an electromagnetic force generated between the fifth magnet 731 and the fifth coil 733.

The fifth magnet 731 and the fifth coil 733 may generate a driving force in the direction (e.g., second axis (Y-axis) direction) perpendicular to the direction (or optical axis direction) in which the fifth magnet 731 and the fifth coil 733 face each other.

The moving frame 400 may be rotated by the third sub-driving portion 710 and the fourth sub-driving portion 730.

For example, the rotational force may be generated by controlling the driving force of the third sub-driving portion 710 and the driving force of the fourth sub-driving portion 730, thereby rotating the moving frame 400.

The fourth magnet 711 and the fifth magnet 731 may be disposed perpendicular to each other on a plane perpendicular to the optical axis (Z-axis), and the fourth coil 713 and the fifth coil 733 may also be disposed perpendicular to each other on a plane perpendicular to the optical axis (Z-axis).

The third ball unit B3 may be disposed between the OIS housing 300 and the moving frame 400.

The third ball unit B3 may be disposed to be in contact with each of the OIS housing 300 and the moving frame 400.

The third ball unit B3 may function to guide the movement of the moving frame 400 during the optical image stabilization process. In addition, the third ball unit B3 may serve to maintain a gap between the OIS housing 300 and the moving frame 400.

The third ball unit B3 may roll in the first axis (X-axis) direction when a driving force is generated in the first axis (X-axis) direction. Therefore, the third ball unit B3 may guide the movement of the moving frame 400 in the first axis (X-axis) direction.

In addition, the third ball unit B3 may roll in the second axis (Y-axis) direction when a driving force is generated in the second axis (Y-axis) direction. Therefore, the third ball unit B3 may guide the movement of the moving frame 400 in the second axis (Y-axis) direction.

The third ball unit B3 may include a plurality of balls disposed between the OIS housing 300 and the moving frame 400.

Sixth guide grooves g6 in which the third ball unit B3 is disposed may be formed in either one or both of the surfaces of the OIS housing 300 and the moving frame 400 facing each other in the optical axis (Z-axis) direction. A number of the sixth guide grooves g6 may correspond to a number of the plurality of balls included in the third ball unit B3.

For example, the sixth guide grooves g6 may be formed in either one or both of the lower surface of the OIS housing 300 and the upper surface of the moving frame 400.

The third ball unit B3 may be disposed in the sixth guide grooves g6 and fitted between the OIS housing 300 and the moving frame 400.

The sixth guide grooves g6 may have a polygonal or circular shape. A size of the sixth guide grooves g6 may be larger than a diameter of the plurality of balls included in the third ball unit B3. For example, a cross section of the sixth guide grooves g6 may have a size larger than the diameter of the plurality of balls included in the third ball unit B3 on a plane perpendicular to the optical axis (Z-axis).

A specific shape of the sixth guide grooves g6 is not limited as long as their size is larger than the diameter of the plurality of balls included in the third ball unit B3.

Accordingly, the plurality of balls included in the third ball unit B3 may roll in the direction perpendicular to the optical axis (Z-axis) while being accommodated in the sixth guide grooves g6.

When a driving force is generated in the first axis (X-axis) direction, the moving frame 400 may be moved in the first axis (X-axis) direction.

In addition, when a driving force is generated in the second axis (Y-axis) direction, the moving frame 400 may be moved in the second axis (Y-axis) direction.

In addition, the moving frame 400 may be rotated by generating a deviation in either one or both of the magnitude of a driving force generated in the first axis (X-axis) direction and the magnitude of a driving force generated in the second axis (Y-axis) direction.

A portion of the sensor substrate 800 may be coupled to the moving frame 400, and the image sensor S may be disposed on the sensor substrate 800. As a result, the image sensor S may also be moved or rotated as the moving frame 400 is moved or rotated.

Meanwhile, a protrusion protruding toward the sensor substrate 800 may be disposed on the moving frame 400. For example, the protrusion may be disposed on the lower surface of the moving frame 400, and the protrusion may be coupled to a second moving part 851 (see FIG. 20) of the sensor substrate 800. Therefore, a gap may be formed between the body of the moving frame 400 except for the protrusion and the sensor substrate 800 in the optical axis (Z-axis) direction, thereby preventing interference between the moving frame 400 and the sensor substrate 800 when the moving frame 400 is moved on an X-Y plane.

Although it has been described that the protrusion is disposed on the lower surface of the moving frame 400, this configuration is only an example, and the protrusion may also be disposed on an upper surface of the sensor substrate 800.

Figure 22:
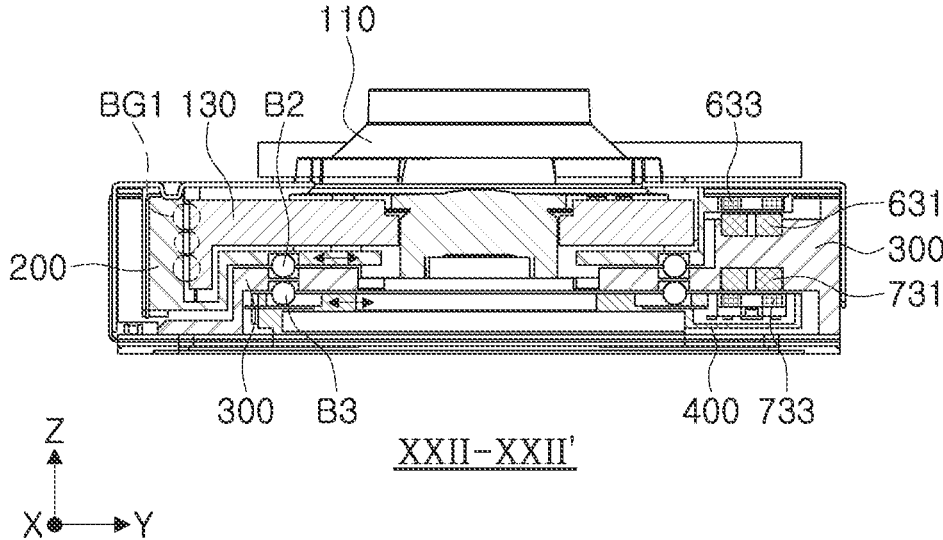
FIG. 22 is a cross-sectional view of the camera module of FIG. 1 taken along the line XXII-XXII' in FIG. 1.

FIG. 22 shows a positional relationship between the first ball unit B1, the second ball unit B2, and the third ball unit B3.

Referring to FIGS. 8 and 22 together, the carrier 130 may include the first guide part 131 protruding in the optical axis (Z-axis) direction, and the AF housing 200 may include the second guide part 230 protruding in the optical axis (Z-axis) direction. The first guide part 131 may be accommodated in the second guide part 230, and the second guide part 230 may be disposed in the stepped part 330 of the OIS housing 300.

The fifth guide grooves g5 may be formed in the upper surface of the OIS housing 300, and the sixth guide grooves g6 may be formed in the lower surface of the OIS housing 300. The stepped part 330 of the OIS housing 300 may have a stepped shape on the upper surface of the OIS housing 300, and the first guide part 131 and the second guide part 230 disposed on the stepped part 330 of the OIS housing 300 may extend below the upper surface of the OIS housing 300 in the optical axis (Z-axis) direction.

That is, a lower surface of the second guide part 230 in the AF housing 200 may be positioned below the second ball unit B2 disposed on the upper surface of the OIS housing 300 in the optical axis (Z-axis) direction.

In addition, the lower surface of the second guide part 230 in the AF housing 200 may be positioned below the third ball unit B3 disposed on the lower surface of the OIS housing 300 in the optical axis (Z-axis) direction.

In addition, the first ball unit B1 may be disposed between the first guide part 131 and the second guide part 230, and a ball disposed at a lowest position in the optical axis (Z-axis) direction among the plurality of balls included in the first ball unit B1 may thus be positioned below the upper surface of the OIS housing 300 in the optical axis (Z-axis) direction.

In addition, when viewed from the first axis (X-axis) direction, the center of the ball disposed at the lowermost side in the optical axis (Z-axis) direction among the plurality of balls included in the first ball unit B1 may be positioned between the center of the second ball unit B2 and the center of the third ball unit B3.

The camera module 1 according to an embodiment of the present disclosure may detect a position of the moving frame 400 in the direction perpendicular to the optical axis (Z-axis).

To this end, a fourth position sensor 715 and a fifth position sensor 735 may be provided. The fourth position sensor 715 may be disposed in the moving frame 400 to face the fourth magnet 711, and the fifth position sensor 735 may be disposed in the moving frame 400 to face the fifth magnet 731. The fourth position sensor 715 and the fifth position sensor 735 may be Hall sensors.

The fifth position sensor 735 may include two Hall sensors. For example, the fifth magnet 731 may include two magnets spaced apart from each other in the direction (e.g., first axis (X-axis) direction) perpendicular to the direction (e.g., second axis (Y-axis) direction) in which a driving force is generated by the fifth magnet 731, and the fifth position sensor 735 may include the two Hall sensors facing the two magnets.

It is possible to detect whether the moving frame 400 is rotated through the two Hall sensors facing the fifth magnet 731.

A rotational force may be intentionally generated by using a deviation generated in the driving force of the third sub-driving portion 710 and the driving force of the fourth sub-driving portion 730, a resultant force of the third sub-driving portion 710 and the fourth sub-driving portion 730, two magnets and two coils, included in the fourth sub-driving portion 730, or any other suitable technique.

The sixth guide grooves g6 may have the polygonal or circular shape having a size that is larger than the diameter of the plurality of balls included in the third ball unit B3, and the plurality of balls included in the third ball unit B3 disposed in the sixth guide grooves g6 may roll without limitation in the direction perpendicular to the optical axis (Z-axis).

Accordingly, the moving frame 400 may be rotated about the optical axis (Z-axis) or any axis parallel to the optical axis (Z-axis) while being supported by the third ball unit B3.

In addition, when the camera module needs the linear movement without the rotation, the unintentionally generated rotational force may be offset by controlling the driving force of the third sub-driving portion 710 and/or the driving force of the fourth sub-driving portion 730.

Referring to FIGS. 13 through 17, the fourth coil 713 and the fifth coil 733 may be disposed in the moving frame 400, and a wiring pattern 410 may be disposed in the moving frame 400. The wiring pattern 410 may be connected with the fourth coil 713 and the fifth coil 733. In addition, the wiring pattern 410 of the moving frame 400 may also be connected with the sensor substrate 800. Accordingly, the fourth coil 713 and the fifth coil 733 may receive the power through the wiring pattern 410 disposed in the moving frame 400.

That is, the camera module 1 according to an embodiment of the present disclosure may not include a separate printed circuit board for supplying the power to the third driving portion 700, and may supply the power to the third driving portion 700 by including the wiring pattern 410 in the moving frame 400 itself.

The wiring pattern 410 may be integrally coupled to the moving frame 400 by insert injection molding. For example, the wiring pattern 410 may be manufactured to be integrated with the moving frame 400 by injecting the resin material into the mold while the wiring pattern 410 is disposed in the mold.

The camera module 1 according to an embodiment of the present disclosure may undergo at least two injections in a process of manufacturing the moving frame 400.

The wiring pattern 410 may have insufficient rigidity when having a pattern width minimized to reduce its size, and it may thus be difficult to fix position of the wiring pattern 410 during the insert injection.

Therefore, a primary injection molded product (e.g., a first frame 420) integrated with the wiring pattern 410 may be manufactured by a primary insert injection molding process, and a secondary injection molded product (e.g., a second frame 440) integrated with the primary injection molded product may be manufactured by a second insert injection molding process, thereby manufacturing the moving frame 400 having the wiring pattern 410 therein.

Since two insert injection molding processes are performed, a boundary line BL (see FIG. 16) may thus be formed between the first frame 420, the primary injection molded product, and the second frame 440, the secondary injection molded product.

The fourth coil 713, the fifth coil 733, the fourth position sensor 715, and the fifth position sensor 735 may be mounted in the first frame 420, the primary injection molded product. The fourth coil 713, the fifth coil 733, the fourth position sensor 715, and the fifth position sensor 735 may be connected to the wiring pattern 410 positioned in the first frame 420.

The wiring pattern 410 may include a wiring part 411 and a terminal part 413. The wiring part 411 may be positioned in the first frame 420, and the terminal part 413 may be exposed externally from the first frame 420. In addition, the terminal part 413 may also be exposed externally from the second frame 440. The terminal part 413 of the wiring pattern 410 may be connected to the sensor substrate 800, and power may thus be applied to the fourth coil 713, the fifth coil 733, the fourth position sensor 715, and the fifth position sensor through the wiring pattern 410.

The sixth guide grooves g6 in which the third ball unit B3 is disposed may be formed in the second frame 440. The third ball unit B3 may be made of a ceramic material and the second frame 440 may be made of a plastic material, and accordingly, there is a risk that the sixth guide grooves g6 may be damaged due to a difference in their hardnesses.

Therefore, support pads 430 may be disposed on a bottom surface of the sixth guide grooves g6 to prevent the damage to the sixth guide grooves g6, and the support pads 430 may be insert injection molded in the secondary insert injection molding process to be integrated with the second frame 440. The support pads 430 may be made of stainless steel.

The support pads 430 may form the bottom surface of the sixth guide grooves g6. Accordingly, the third ball unit B3 may roll in contact with the support pads 430.

A fourth yoke and a fifth yoke (not shown) may be disposed in the moving frame 400. The fourth yoke and the fifth yoke may provide an attractive force so that the OIS housing 300 and the moving frame 400 remain in contact with the third ball unit B3.

The fourth yoke and the fifth yoke may be insert injection molded in the same manner as the wiring pattern 410 in the primary insert injection molding process to be integrated with the first frame 420.

The fourth yoke and the fifth yoke may be disposed to face the fourth magnet 711 and the fifth magnet 731 in the optical axis (Z-axis) direction.

The attractive forces may respectively act between the fourth yoke and the fourth magnet 711 and between the fifth yoke and the fifth magnet 731 in the optical axis (Z-axis) direction.

Accordingly, the moving frame 400 may be pressed toward the OIS housing 300, and the OIS housing 300 and the moving frame 400 may thus remain in contact with the third ball unit B3.

The fourth yoke and the fifth yoke may each be made of a material which may generate the attractive force between the fourth magnet 711 and the fifth magnet 731. For example, the fourth yoke and the fifth yoke may each be made of a magnetic material.

Figure 18:
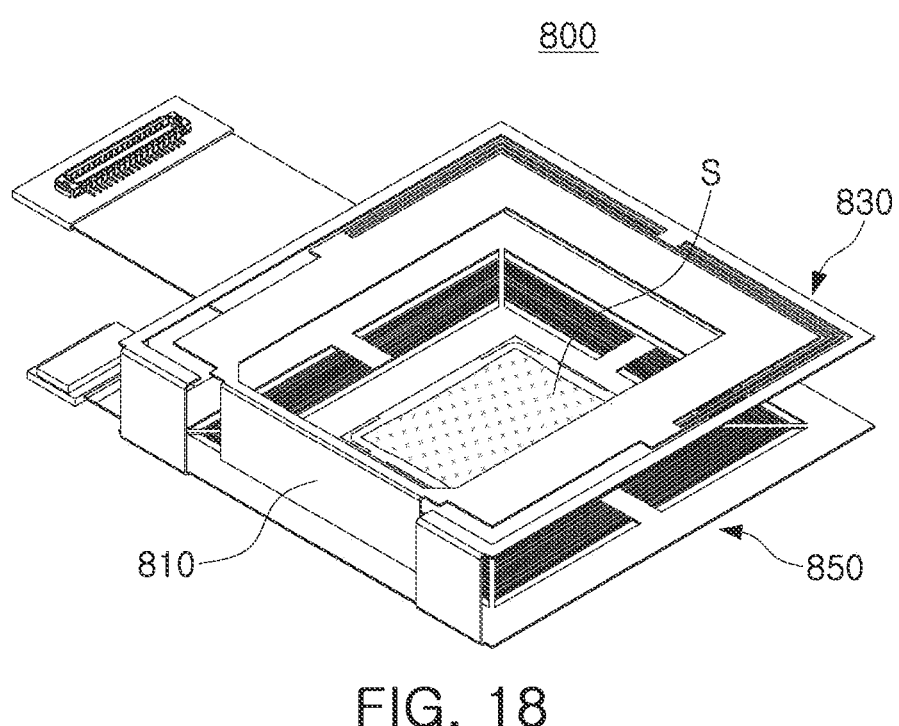
FIG. 18 is a perspective view of a sensor substrate according to an embodiment of the present disclosure.
Figure 19:
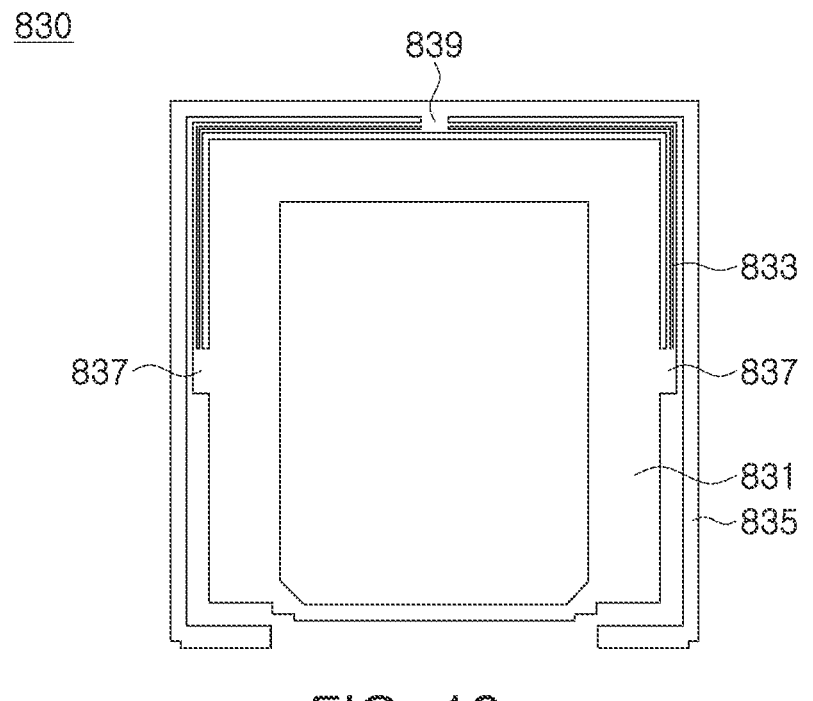
FIG. 19 is a plan view of a first optical image stabilization (OIS) substrate of the sensor substrate.
Figure 20:
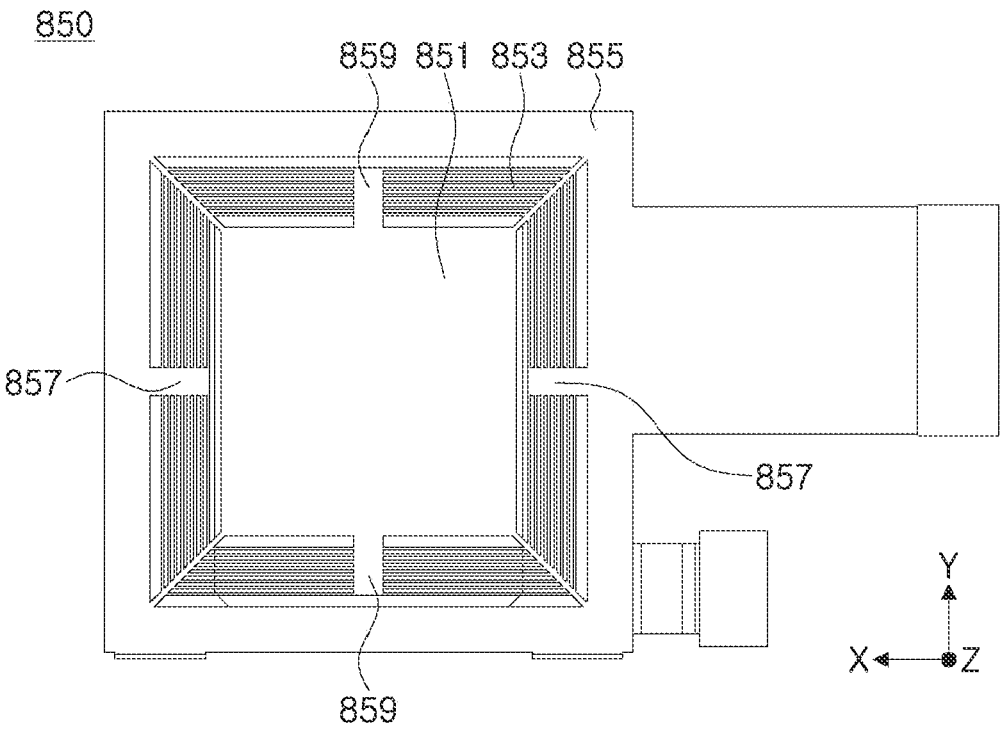
FIG. 20 is a bottom view of a second optical image stabilization (OIS) substrate of the sensor substrate.

FIG. 18 is a perspective view of a sensor substrate according to an embodiment of the present disclosure. FIG. 19 is a plan view of a first optical image stabilization (OIS) substrate of the sensor substrate. FIG. 20 is a bottom view of a second optical image stabilization (OIS) substrate.

Referring to FIG. 18, the sensor substrate 800 may include the AF substrate 810, the first OIS substrate 830, and a second optical image stabilization (OIS) substrate 850.

The first OIS substrate 830 may include a first moving part 831, a first fixed part 835, and a first connection part 833. The first OIS substrate 830 may be a radio-frequency printed circuit board (RF PCB).

The first moving part 831 may be coupled to the AF housing 200. For example, the first moving part 831 may be coupled to the flange part 250 of the AF housing 200. The second coil 613 and the third coil 633 of the second driving portion 600 may be disposed on one surface of the first moving part 831, and the second yoke and the third yoke may be disposed on the other surface of the first moving part 831.

The first moving part 831 may be a moving member movable together with the AF housing 200 during the optical image stabilization. The first moving part 831 may be a rigid printed circuit board (PCB).

The first fixed part 835 may be coupled to the OIS housing 300 or the case 930. The first fixed part 835 may be a fixed member that does not move during the optical image stabilization. The first fixed part 835 may be a rigid PCB.

The first connection part 833 may be disposed between the first moving part 831 and the first fixed part 835, and may connect the first moving part 831 and the first fixed part 835 with each other. The first connection part 833 may be a flexible PCB. The first connection part 833 disposed between the first moving part 831 and the first fixed part 835 may be bent when the first moving part 831 is moved.

The first connection part 833 may extend along at least a portion of a perimeter of the first moving part 831. The first connection part 833 may include a plurality of slits each passing through the first connection part 833 in the optical axis direction. The plurality of slits may each be disposed with a gap between the first moving part 831 and the first fixed part 835. Accordingly, the first connection part 833 may include a plurality of bridge elements spaced apart from each other by the plurality of slits. The plurality of bridge elements may extend along the perimeter of the first moving part 831.

The first connection part 833 may include a first support part 837 and a second support part 839. The first connection part 833 may be connected to the first moving part 831 through the first support part 837. In addition, the first connection part 833 may be connected to the first fixed part 835 through the second support part 839.

For example, the first support part 837 may be contact-connected to the first moving part 831, and spaced apart from the first fixed part 835. In addition, the second support part 839 may be contact-connected to the first fixed part 835, and spaced apart from the first moving part 831.

For example, the first support part 837 may extend in the first axis direction (or X-axis direction) to connect the plurality of bridges of the first connection part 833 and the first moving part 831 with each other. In an embodiment, the first support part 837 may include two support parts disposed opposite to each other in the first axis direction (X-axis direction).

The second support part 839 may extend in the second axis direction (Y-axis direction) to connect the plurality of bridges of the first connection part 833 and the first fixed part 835 with each other. In an embodiment, the second support part 839 may include one support part.

Accordingly, the first moving part 831 may be moved in the direction perpendicular to the optical axis (Z-axis) or rotated about the optical axis (Z-axis) or any axis parallel to the optical axis (Z-axis) while being supported by the first connection part 833.

In an embodiment, the plurality of bridges connected to the first support part 837 may be bent when the image sensor S is moved in the first axis direction (X-axis direction). In addition, the plurality of bridges connected to the second support part 839 may be bent when the image sensor S is moved in the second axis direction (Y-axis direction). In addition, the plurality of bridges connected to the first support part 837 and the plurality of bridges connected to the second support part 839 may be bent together when the image sensor S is rotated.

The AF substrate 810 may extend from the first OIS substrate 830 in the optical axis (Z-axis) direction. For example, the AF substrate 810 may be bent in the optical axis (Z-axis) direction from one side of the first OIS substrate 830 (e.g., one side of the first moving part 831). The AF substrate 810 may be coupled to the AF housing 200, the first coil 530 may be disposed on one surface of the AF substrate 810, and the first yoke 550 may be disposed on the other surface of the AF substrate 810.

The second OIS substrate 850 may include a second moving part 851, a second fixed part 855, and a second connection part 853. The second OIS substrate 850 may be an RF PCB.

An image sensor S may be mounted on the second moving part 851. The second moving part 851 may be coupled to the lower surface of the moving frame 400. For example, an area of the second moving part 851 may be larger than an area of the image sensor S, and a portion of the second moving part 851 outside the image sensor S may be coupled to the lower surface of the moving frame 400.

The second moving part 851 may be a moving member movable together with the moving frame 400 during the optical image stabilization. The second moving part 851 may be a rigid PCB.

The second fixed part 855 may be coupled to the lower surface of the OIS housing 300. The second fixed part 855 may be a fixed member that does not move during the optical image stabilization. The second fixed part 855 may be a rigid PCB. The second fixed part 855 may be bent from and extend from the first fixed part 835 of the first OIS substrate 830.

The second connection part 853 may be disposed between the second moving part 851 and the second fixed part 855, and may connect the second moving part 851 and the second fixed part 855 with each other. The second connection part 853 may be a flexible PCB. The second connection part 853 disposed between the second moving part 851 and the second fixed part 855 may be bent when the second moving part 851 is moved.

The second connection part 853 may extend along the perimeter of the second moving part 851. The second connection part 853 may include a plurality of slits passing through the second connection part 853 in the optical axis direction. The plurality of slits may each be disposed with a gap between the second moving part 851 and the second fixed part 855. Accordingly, the second connection part 853 may include a plurality of bridge elements spaced apart from each other by the plurality of slits. The plurality of bridge elements may extend along the perimeter of the second moving part 851.

The second connection part 853 may include a third support part 857 and a fourth support part 859. The second connection part 853 may be connected to the second fixed part 855 through the third support part 857. In addition, the second connection part 853 may be connected to the second moving part 851 through the fourth support part 859.

For example, the third support part 857 may be contact-connected to the second fixed part 855, and spaced apart from the second moving part 851. In addition, the fourth support part 859 may be contact-connected to the second moving part 851, and spaced apart from the second fixed part 855.

For example, the third support part 857 may extend in the first axis direction (or X-axis direction) to connect the plurality of bridges of the second connection part 853 and the second fixed part 855 with each other. In an embodiment, the third support part 857 may include two support parts disposed opposite to each other in the first axis direction (X-axis direction).

The fourth support part 859 may extend in the second axis direction (Y-axis direction) to connect the plurality of bridges of the second connection part 853 and the second moving part 851 with each other. In an embodiment, the fourth support part 859 may include two support parts disposed opposite to each other in the second axis direction (Y-axis direction).

Accordingly, the second moving part 851 may be moved in the direction perpendicular to the optical axis (Z-axis) or rotated about the optical axis (Z-axis) or any axis parallel to the optical axis (Z-axis) while being supported by the second connection part 853.

In an embodiment, the plurality of bridges connected to the third support part 857 may be bent when the image sensor S is moved in the first axis direction (X-axis direction). In addition, the plurality of bridges connected to the fourth support part 859 may be bent when the image sensor S is moved in the second axis direction (Y-axis direction). In addition, the plurality of bridges connected to the third support part 857 and the plurality of bridges connected to the fourth support part 859 may be bent together when the image sensor S is rotated.

The first OIS substrate 830 and the second OIS substrate 850 may be connected with each other. For example, the first fixed part 835 of the first OIS 830 may be connected with the second fixed part 855 of the second OIS substrate 850.

In this embodiment, the AF substrate 810, the first OIS substrate 830, and the second OIS substrate 850 are described as one body. However, this configuration is only an example. The AF substrate 810, the first OIS substrate 830, and the second OIS substrate 850 may also be provided as separate components and electrically connected with one another.

Referring to FIG. 2, a base 910 may be coupled to a lower portion of the sensor substrate 800.

The base 910 may be coupled to the sensor substrate 800 to cover the lower portion of the sensor substrate 800. The base 910 may serve to prevent external foreign material from being introduced into the camera module through the gap between the second moving part 851 and the second fixed part 855 of the sensor substrate 800.

Figure 21:
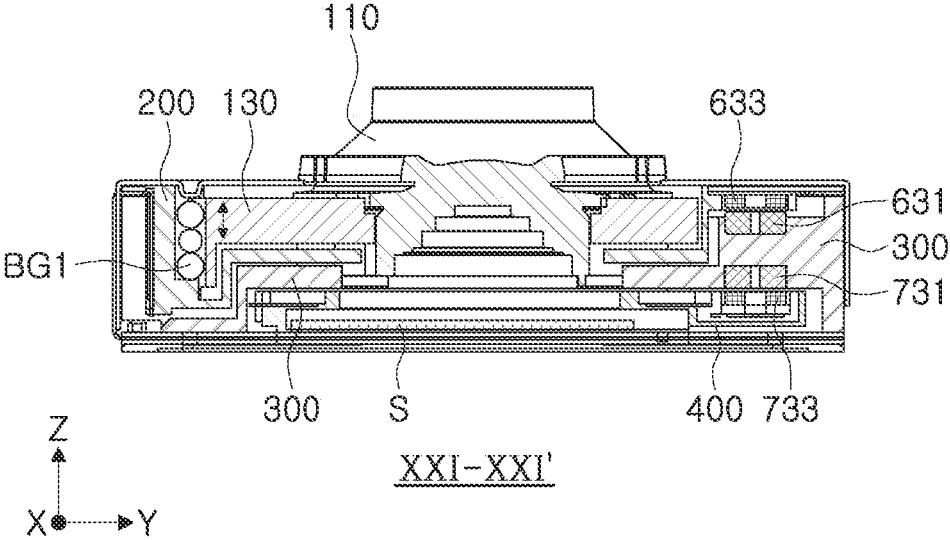
FIG. 21 is a cross-sectional view of the camera module of FIG. 1 taken along the line XXI-XXI' in FIG. 1.

FIG. 21 is a cross-sectional view of the camera module of FIG. 1 taken along the line XXI-XXI' in FIG. 1; and FIG. 22 is a cross-sectional view of the camera module of FIG. 1 taken along the line XXII-XXII' in FIG. 1.

Referring to FIGS. 21 and 22, in the camera module 1 according to an embodiment of the present disclosure, the carrier 130 may be moved relative to the AF housing 200 in the optical axis (Z-axis) direction during the autofocusing. The lens barrel 110 may be coupled to the carrier 130, and the lens barrel 110 may thus also be moved together with the carrier 130 in the optical axis (Z-axis) direction as the carrier 130 is moved.

During the optical image stabilization, the AF housing 200 may be moved with respect to the OIS housing 300 in the direction perpendicular to the optical axis (Z-axis).

The lens module 100 may be accommodated in the AF housing 200, and the first ball unit B1 may be disposed between the AF housing 200 and the lens module 100.

The first ball unit B1 may be disposed in the first guide groove part G1 and the second guide groove part G2 to have a restricted movement in the direction perpendicular to the optical axis (Z-axis) (that is, the first ball unit B1 may be disposed to be moved in the optical axis (Z-axis) direction). Accordingly, the lens module 100 may also be moved together with the AF housing 200 in the direction perpendicular to the optical axis (Z-axis) when the AF housing 200 is moved in the direction perpendicular to the optical axis (Z-axis).

In addition, during the optical image stabilization, the moving frame 400 may be moved with respect to the OIS housing 300 in the direction perpendicular to the optical axis (Z-axis). The sensor substrate 800 mounted with the image sensor S may be coupled to the moving frame 400, and the image sensor S may also be moved in the direction perpendicular to the optical axis (Z-axis) together with the moving frame 400 when the moving frame 400 is moved in the direction perpendicular to the optical axis (Z-axis).

In an embodiment, the AF housing 200 may be disposed on one side of the OIS housing 300 in the optical axis (Z-axis) direction, and the moving frame 400 may be disposed on the other side thereof in the optical axis (Z-axis) direction.

The AF housing 200 may be moved relative to the OIS housing 300 to perform the optical image stabilization, and the moving frame 400 may also be moved relative to the OIS housing 300 to perform the optical image stabilization.

The second driving portion 600 providing a driving force to the AF housing 200 and the third driving portion 700 providing a driving force to the moving frame 400 may be operated independently of each other, and either one of the AF housing 200 and the moving frame 400 may thus be moved to perform the optical image stabilization.

In addition, both the AF housing 200 and the moving frame 400 may be moved to perform the optical image stabilization. In this case, the AF housing 200 and the moving frame 400 may be moved in directions opposite to each other.

For example, the moving frame 400 may be moved in a negative first axis (X-axis) direction (or −X-axis direction) when the AF housing 200 is moved in a positive first axis (X-axis) direction (or +X-axis direction). In addition, the moving frame 400 may be moved in a negative second axis (Y-axis) direction (or −Y-axis direction) when the AF housing 200 is moved in a positive second axis (Y-axis) direction (or +Y-axis direction).

As described above, the AF housing 200 and the moving frame 400 may be moved in the directions opposite to each other, thereby maximizing an optical image stabilization effect even when a smaller distance is moved. That is, the optical image stabilization effect may be improved even when the magnitude of a driving force for moving the AF housing 200 and the moving frame 400 is reduced.

In addition, relative positions of the magnets and coils of the second driving portion 600 and relative positions of the magnets and coils of the third driving portion 700 may not be changed even when the lens module 100 is moved in the optical axis (Z-axis) direction during the autofocusing, and it is thus possible to precisely control a driving force for the optical image stabilization.

In addition, the relative positions of the magnet and the coil of the first driving portion 500 may not be changed even when either one or both of the AF housing 200 and the moving frame 400 is moved in the direction perpendicular to the optical axis (Z-axis) during the optical image stabilization, and it is thus possible to precisely control a driving force for the autofocusing.

Figure 23:
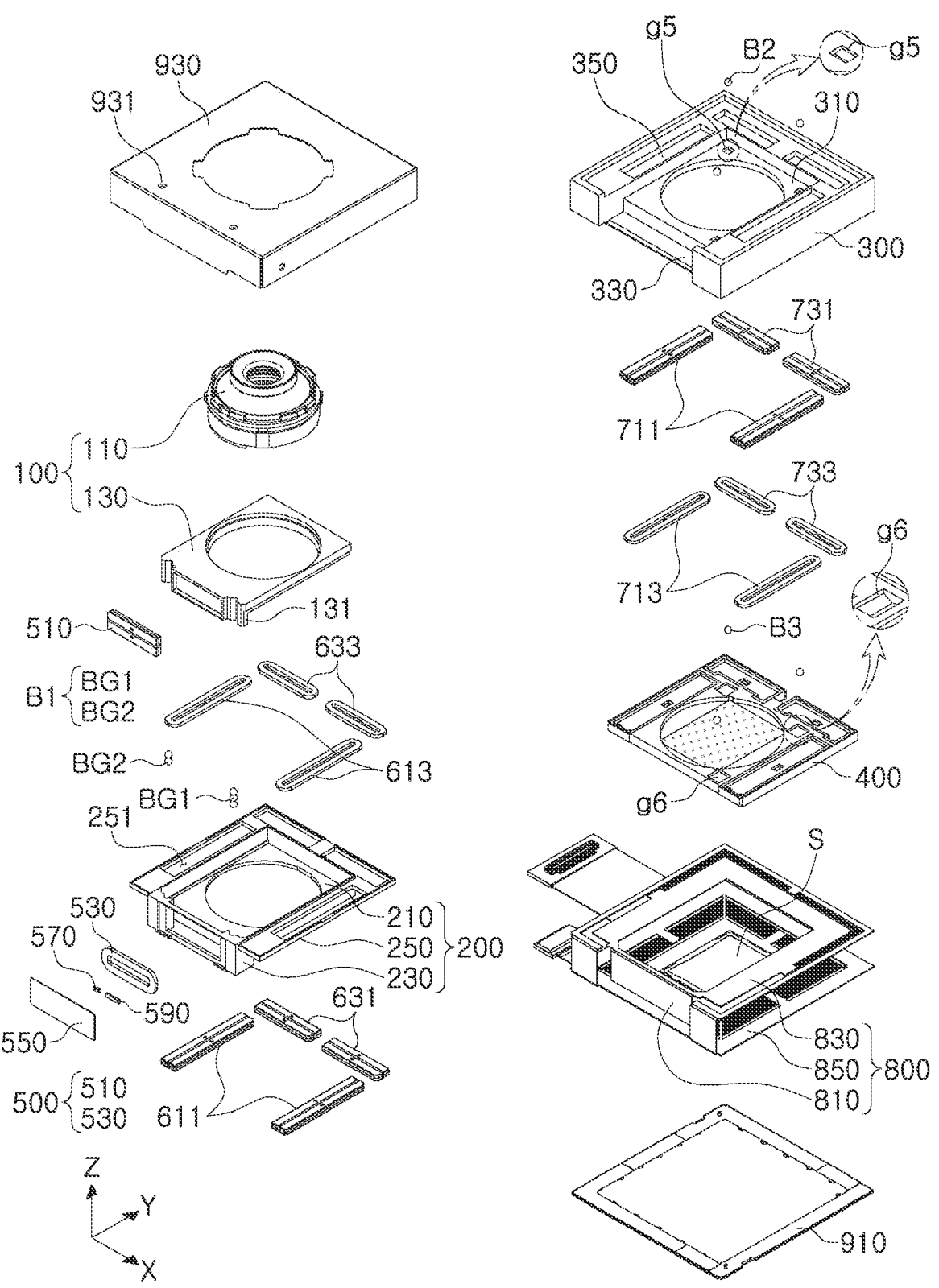
FIG. 23 is a schematic exploded perspective view of a camera module according to another embodiment of the present disclosure.

FIG. 23 is a schematic exploded perspective view of a camera module according to another embodiment of the present disclosure.

Another embodiment shown in FIG. 23 is different from an embodiment described with reference to FIGS. 1 through 22 in shapes of the fifth guide grooves g5 and the sixth guide grooves g6.

For example, the fifth guide grooves g5 may be elongated in the first axis (X-axis) direction, and the sixth guide grooves g6 may be elongated in the second axis (Y-axis) direction. In addition, cross sections of the fifth guide grooves g5 and the sixth guide grooves g6 may each have a 'V' shape.

The fifth guide grooves g5 may be formed in either one or both of the surfaces of the AF housing 200 and the OIS housing 300 facing each other in the optical axis (Z-axis) direction.

The sixth guide grooves g6 may be formed in either one or both of the surfaces of the OIS housing 300 and the moving frame 400 facing each other in the optical axis (Z-axis) direction.

A length direction of the fifth guide grooves g5 may be parallel to a short side of the image sensor S. In addition, a length direction of the sixth guide grooves g6 may be parallel to a long side of the image sensor S.

The second ball unit B2 disposed in the fifth guide grooves g5 may roll in the first axis (X-axis) direction, and have a restricted movement in directions other than the first axis (X-axis) direction. In addition, the third ball unit B3 disposed in the sixth guide grooves g6 may roll in the second axis (Y-axis) direction, and have a restricted movement in directions other than the second axis (Y-axis) direction.

Accordingly, during the optical image stabilization, the AF housing 200 may be moved with respect to the OIS housing 300 in the first axis (X-axis) direction, and the moving frame 400 may be moved with respect to the OIS housing 300 in the second axis (Y-axis) direction.

That is, in another embodiment of FIG. 23, the optical image stabilization in the first axis (X-axis) direction may be achieved through the movement of the AF housing 200, and the optical image stabilization in the second axis (Y-axis) direction may be achieved through the movement of the moving frame 400.

Figure 24:
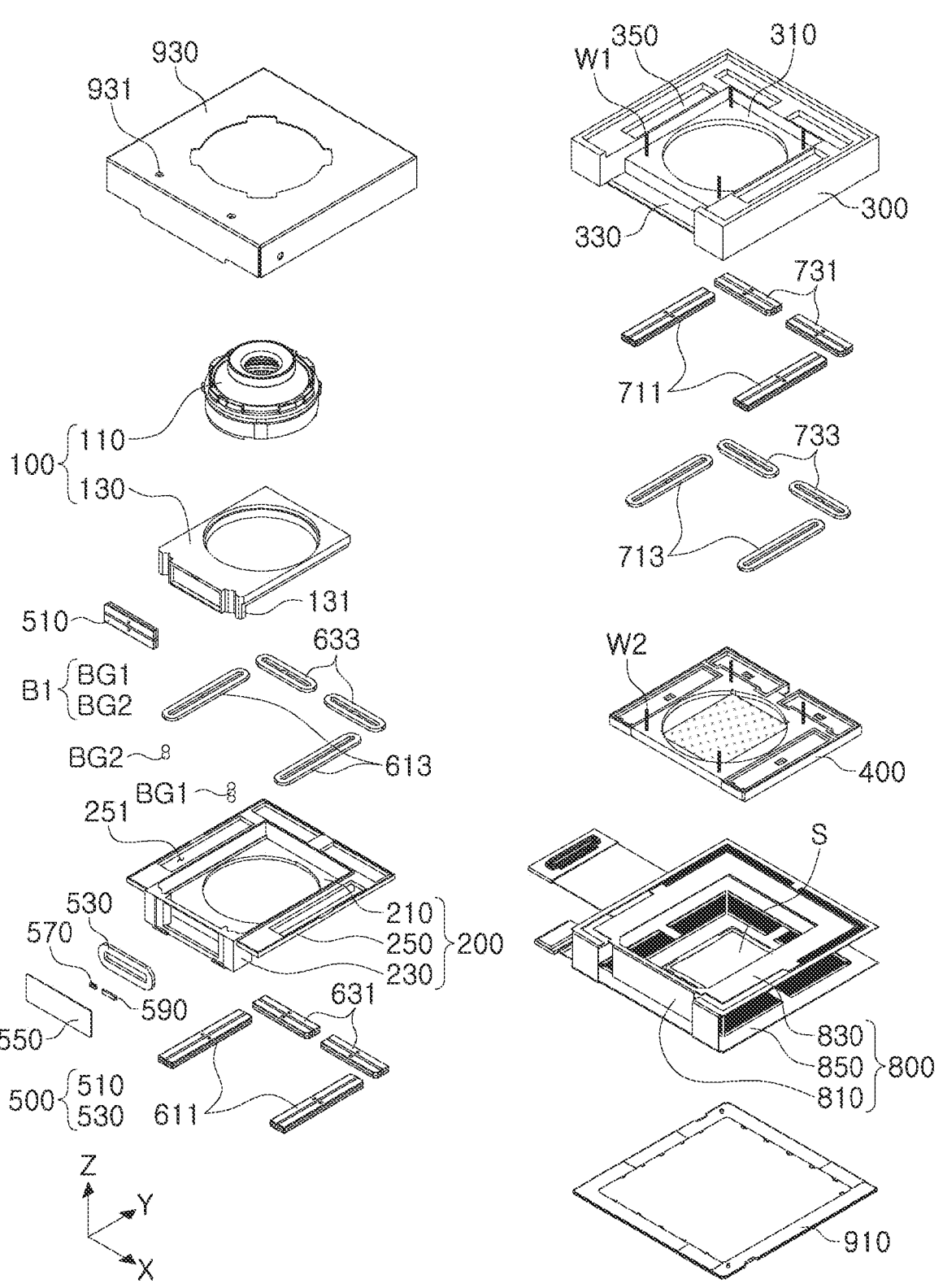
FIG. 24 is a schematic exploded perspective view of a camera module according to another embodiment of the present disclosure.

FIG. 24 is a schematic exploded perspective view of a camera module according to another embodiment of the present disclosure.

The embodiment shown in FIG. 24 is different from the embodiments described above in the configuration for supporting the movement of the AF housing 200 and the moving frame 400.

For example, in the embodiment shown in FIG. 24, a plurality of first suspension wires W1 may be disposed between the AF housing 200 and the OIS housing 300, and a plurality of second suspension wires W2 may be disposed between the OIS housing 300 and the moving frame 400.

One end of each of the plurality of first suspension wires W1 may be connected to the AF housing 200, and the other end of each of the plurality of first suspension wires W1 may be connected to the OIS housing 300. Accordingly, the AF housing 200 may be movably supported by the plurality of first suspension wires W1.

In addition, one end of each of the plurality of second suspension wires W2 may be connected to the OIS housing 300, and the other end of each of the plurality of second suspension wires W2 may be connected to the moving frame 400. Accordingly, the moving frame 400 may be movably supported by the plurality of second suspension wires W2.

Figure 25:
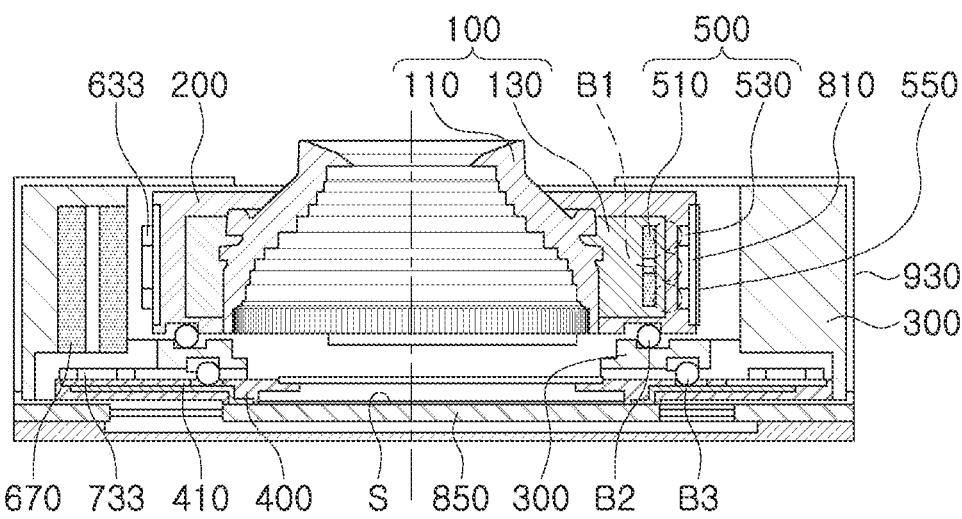
FIG. 25 is a schematic cross-sectional view of a camera module according to another embodiment of the present disclosure.
Figure 25:
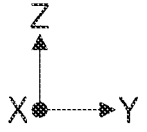
Figure 26:
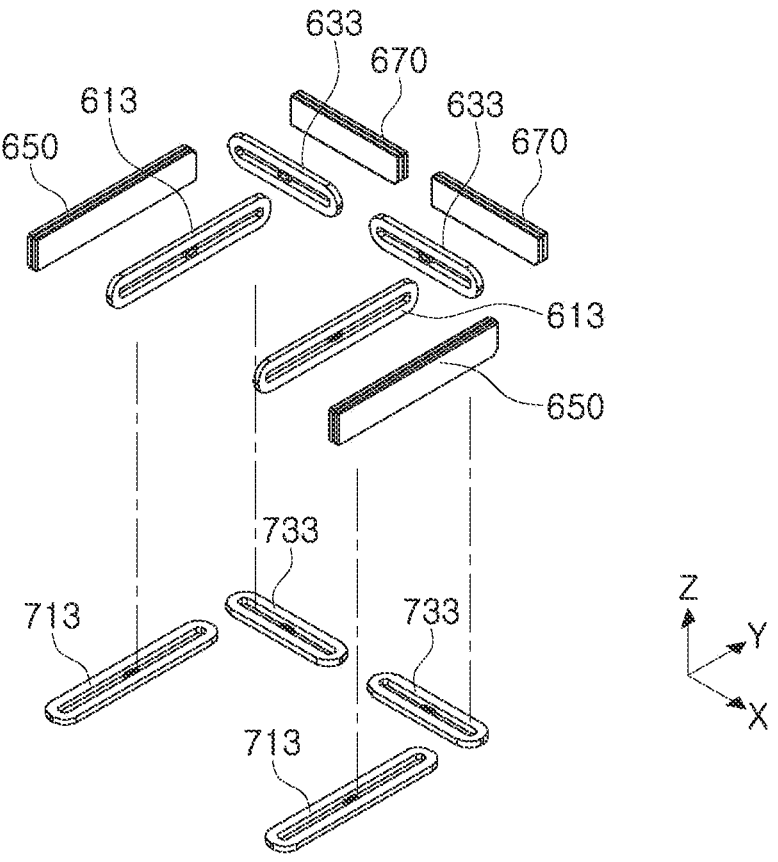
FIG. 26 is a perspective view of a second driving portion and a third driving portion of the camera module of FIG. 25.

FIG. 25 is a schematic cross-sectional view of a camera module according to another embodiment of the present disclosure. FIG. 26 is a perspective view of a second driving portion and a third driving portion of the camera module of FIG. 25.

In an embodiment described with reference to FIGS. 1 through 22, the AF housing 200 may be moved by the second driving portion 600, and the moving frame 400 may be moved by the third driving portion 700. The second driving portion 600 may include the second magnet 611, the second coil 613, the third magnet 631 and the third coil 633, and the third driving portion 700 may include the fourth magnet 711, the fourth coil 713, the fifth magnet 731 and the fifth coil 733. That is, the magnets included in the second driving portion 600 and the third driving portion 700 may be provided as separate magnets.

However, in the embodiment shown in FIG. 25, the magnet of the second driving portion 600 and the magnet of the third driving portion 700 may be the same magnet.

For example, a first common magnet 650 and a second common magnet 670 may be mounted in the OIS housing 300.

The first common magnet 650 may interact with the second coil 613 to generate a driving force for moving the AF housing 200, and the second common magnet 670 may interact with the third coil 633 to generate a driving force for moving the AF housing 200.

In addition, the first common magnet 650 may interact with the fourth coil 713 to generate a driving force for moving the moving frame 400, and the second common magnet 670 may interact with the fifth coil 733 to generate a driving force for moving the moving frame 400.

The first common magnet 650 and the second common magnet 670 may each be magnetized to have an N pole, a neutral region, and an S pole in the direction perpendicular to the optical axis (Z-axis) direction.

The second coil 613 and the third coil 633 may be disposed on the AF housing 200. In addition, the second coil 613 may face the first common magnet 650 in the first axis (X-axis) direction. The second coil 613 may face the N pole or the S pole of the first common magnet 650. Accordingly, a driving force may be generated in a direction (e.g., first axis (X-axis) direction) in which the first common magnet 650 and the second coil 613 face each other.

The third coil 633 may face the second common magnet 670 in the second axis (Y-axis) direction. The third coil 633 may face the N pole or the S pole of the second common magnet 670. Accordingly, a driving force may be generated in a direction (e.g., second axis (Y-axis) direction) in which the second common magnet 670 and the third coil 633 face each other.

The fourth coil 713 and the fifth coil 733 may be disposed in the moving frame 400. In addition, the fourth coil 713 may face the first common magnet 650 in the optical axis (Z-axis) direction. The fourth coil 713 may face both the N pole and the S pole of the first common magnet 650. Accordingly, a driving force may be generated in a direction (e.g., first axis (X-axis) direction) perpendicular to the optical axis (Z-axis) direction in which the first common magnet 650 and the fourth coil 713 face each other.

In addition, the fifth coil 733 may face the second common magnet 670 in the optical axis (Z-axis) direction. The fifth coil 733 may face both the N pole and the S pole of the second common magnet 670. Accordingly, a driving force may be generated in a direction (e.g., second axis (Y-axis) direction) perpendicular to the optical axis (Z-axis) direction in which the second common magnet 670 and the fifth coil 733 face each other.

Figure 27:
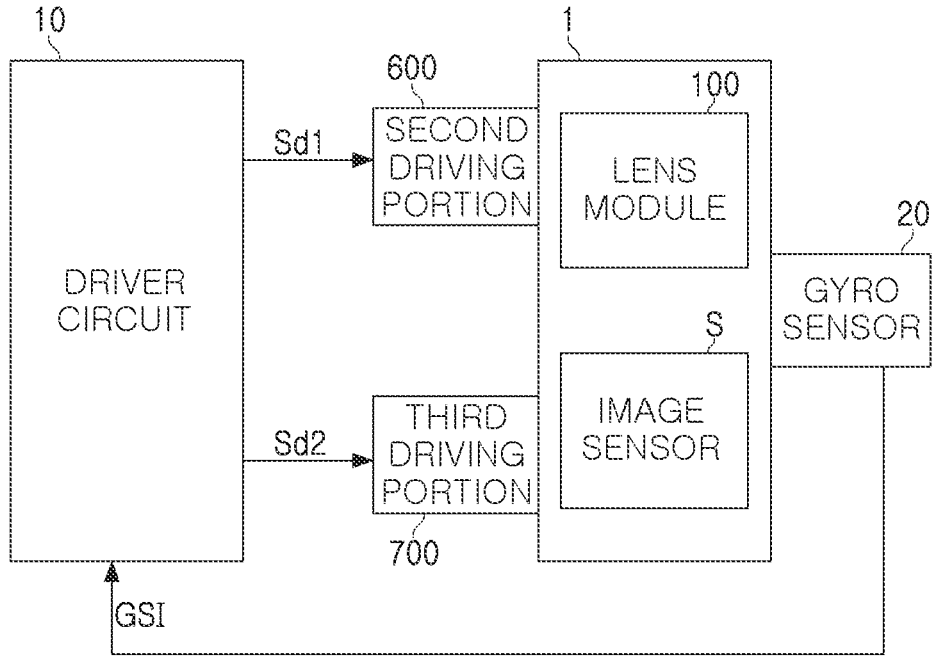
FIG. 27 is a conceptual diagram for explaining control signals provided to the module according to an embodiment of the present disclosure.

FIG. 27 is a conceptual diagram for explaining control signals provided to the camera module according to an embodiment of the present disclosure.

Referring to FIG. 27, the camera module 1 according to an embodiment of the present disclosure may further include a gyro sensor 20 and a driver circuit 10 (i.e., a driver integrated chip (IC) or a control unit).

The gyro sensor 20 may detect image instability of the camera module and output gyro sensor information GSI to the driver circuit 10.

The gyro sensor 20 may be mounted on the camera module 1 (e.g., the OIS housing 300).

The driver circuit 10 may perform control to provide either one or both of a lens driving signal Sd1 for the optical image stabilization of the lens module 100 and a sensor driving signal Sd2 for the optical image stabilization of the image sensor S based on the gyro sensor information GSI.

For example, the driver circuit 10 may analyze the gyro sensor information GSI to determine whether the image instability is a high-angle image instability or a high-frequency image instability. The driver circuit 10 may then perform control to move the lens module 100 for lens-shift stabilization when the image instability is the high-angle image instability, and to move the image sensor S for sensor-shift stabilization when the image instability is the high-frequency image instability, based on a determination result.

For example, the driver circuit 10 may perform control to provide the lens driving signal Sd1 for the optical image stabilization of the lens module 100 to the second driving portion 600 when the image instability is the high-angle image instability, and to provide the sensor driving signal Sd2 for the optical image stabilization of the image sensor S to the third driving portion 700 when the image instability is the high-frequency image instability, based on the gyro sensor information GSI. In addition, the driver circuit 10 may perform control to provide both the lens driving signal Sd1 to the second driving portion 600 and the sensor driving signal Sd2 to the third driving portion 700 when the image instability is both the high-angle image instability and the high-frequency image instability.

The second driving portion 600 may perform the optical image stabilization for the lens module 100 in response to the lens driving signal Sd1.

The third driving portion 700 may perform the optical image stabilization for the image sensor S in response to the sensor driving signal Sd2.

FIGS. 28 through 32 are flowcharts of operations for performing the optical image stabilization in the camera module according to an embodiment of the present disclosure.

Figure 28:
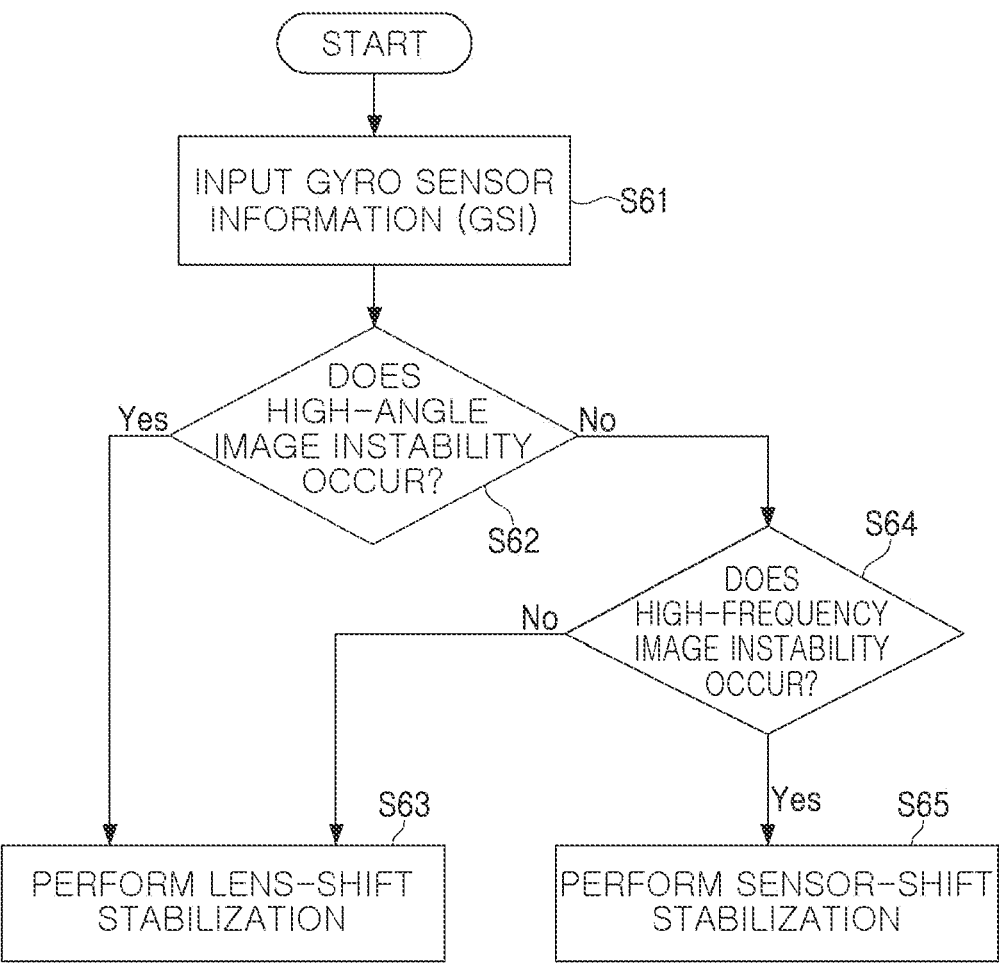
FIGS. 28 through 32 are flowcharts of operations for performing the optical image stabilization in the camera module according to an embodiment of the present disclosure.

First, referring to FIG. 28, the driver circuit 10 may perform control to receive gyro sensor information GSI from the gyro sensor 20 (S61), determine image instability of the camera module 1 based on the gyro sensor information GSI (S62 and S64), and perform control to perform lens-shift stabilization for the lens module 100 by providing a lens driving signal Sd1 for high-angle image stabilization to the second driving portion 600 when high-angle image instability occurs based on an image-instability determination result (S63).

The driver circuit 10 may perform control to perform sensor-shift stabilization for the image sensor S by providing a sensor driving signal Sd2 for high-frequency image stabilization to the third driving portion 700 when high-frequency image instability occurs based on the image-instability determination result (S65).

The driver circuit 10 may perform control to perform the lens-shift stabilization for the lens module 100 by providing a lens driving signal Sd1 for low-angle and low-frequency optical image stabilization to the second driving portion 600 when the image instability is neither the high-angle image instability nor the high-frequency image instability, based on the image-instability determination result (S62, S64, and S63).

Figure 29:
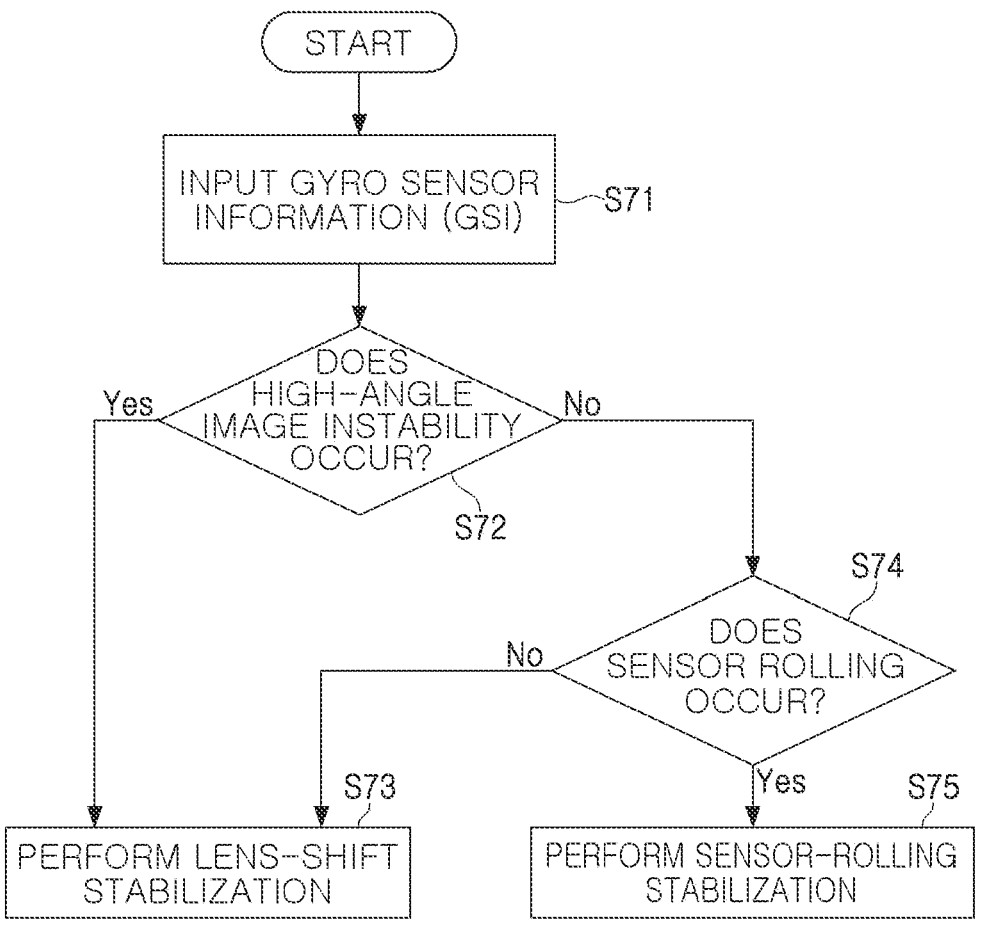

Referring to FIG. 29, the driver circuit 10 may determine image instability of the camera module 1 based on gyro sensor information GSI, and perform control to perform lens-shift stabilization for the lens module 100 by providing a lens driving signal Sd1 for high-angle image stabilization to the second driving portion 600 when high-angle image instability occurs based on an image-instability determination result (S71, S72, and S73).

The driver circuit 10 may perform control to perform sensor-rolling stabilization for the image sensor S by providing a sensor driving signal Sd2 for sensor-rolling stabilization to the third driving portion 700 when sensor rolling occurs based on the image-instability determination result (S71, S72, S74, and S75). Sensor rolling occurs when the image sensor S of the camera module 1 shown in FIG. 27 rotates about an optical axis of the lens module 100 or an axis parallel to the optical axis.

The driver circuit 10 may perform control to perform the lens-shift stabilization for the lens module 100 by providing a lens driving signal Sd1 for low-angle image stabilization and non-sensor-rolling stabilization to the second driving portion 600 when the image instability is neither the high-angle image instability nor sensor rolling based on the image-instability determination result (S71, S72, S74, and S73).

Figure 30:
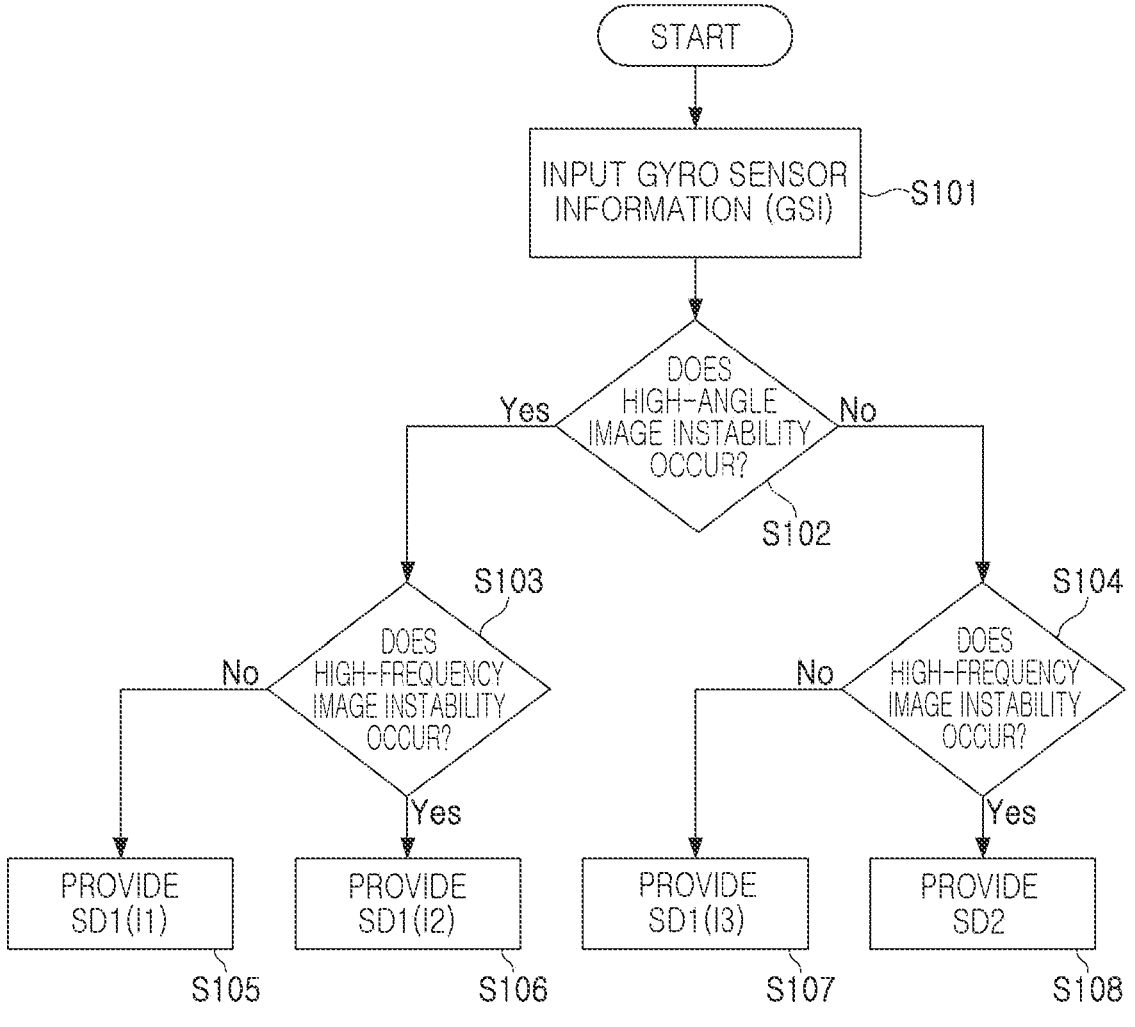

Referring to FIG. 30, the driver circuit 10 may determine image instability of the camera module 1 based on gyro sensor information GSI, and perform control to perform lens-shift stabilization for the lens module 100 by providing a lens driving signal Sd1 having a first driving current I1 for high-angle and low-frequency image stabilization to the second driving portion 600 when the image instability is high-angle image instability and not high-frequency image instability based on an image-instability determination result (S101, S102, S103, and The driver circuit 10 may perform control to perform the lens-shift stabilization for the lens module 100 by providing a lens driving signal Sd1 having a second driving current I2 for high-angle and high-frequency image stabilization to the second driving portion 600 when the image instability is the high-angle and the high-frequency image instability based on the image-instability determination result (S101, S102, S103, and S106).

The driver circuit 10 may perform control to perform the lens-shift stabilization for the lens module 100 by providing a lens driving signal Sd1 having a third driving current I3 for low-angle and low-frequency image stabilization to the second driving portion 600 when the image instability is neither the high-angle image instability nor the high-frequency image instability based on the image-instability determination result (S101, S102, S104, and S107).

The driver circuit 10 may perform control to perform sensor-shift stabilization for the image sensor S by providing a sensor driving signal Sd2 for low-angle and high-frequency image stabilization to the third driving portion when the image instability is the high-frequency image instability and not the high-angle image instability based on the image-instability determination result (S101, S102, S104, and S108).

For example, the first driving current I1, the second driving current I2, and the third driving current I3 may be different from one another, and may be generated by a current generation circuit which may adjust the generated current.

Figure 31:
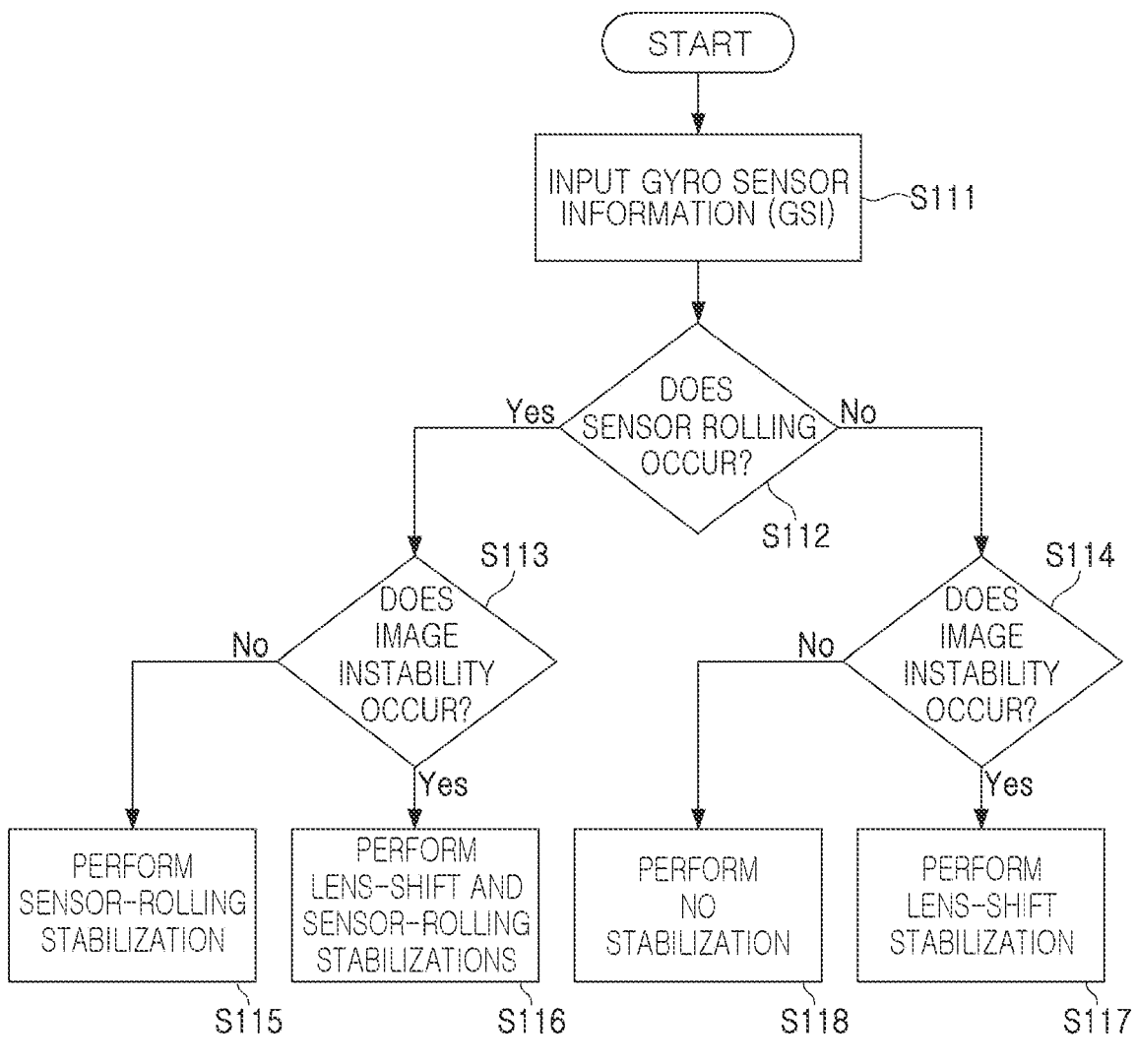

Referring to FIG. 31, the driver circuit 10 may determine image instability of the camera module 1 based on gyro sensor information GSI, and perform control to perform sensor-rolling stabilization for the image sensor S by providing a sensor driving signal Sd2 for driving sensor rolling to the third driving portion 700 when sensor rolling rather than image instability occurs based on an image-instability determination result (S111, S112, S113, and S115).

The driver circuit 10 may perform control to perform lens-shift stabilization for the lens module 100 and the sensor-rolling stabilization for the image sensor S by providing a lens driving signal Sd1 for driving lens shift to the second driving portion 600 and providing the sensor driving signal Sd2 for driving sensor rolling to the third driving portion 700 when both the sensor rolling and the image instability occur based on the image-instability determination result (S111, S112, S113, and S116).

The driver circuit 10 may perform control to perform the lens-shift stabilization for the lens module 100 by providing the lens driving signal Sd1 for driving lens shift to the second driving portion 600 when the image instability rather than the sensor rolling occurs based on the image-instability determination result (S111, S112, S114 and S117).

The driver circuit 10 may perform control to perform neither the lens-shift stabilization for the lens module 100 by nor the sensor-rolling stabilization for the image sensor S by not providing the lens driving signal Sd1 for driving lens shift to the second driving portion 600 and not providing the sensor driving signal Sd2 to the third driving portion when neither the image instability nor the sensor rolling occurs based on the image-instability determination result (S111, S112, S114 and S118).

Figure 32:
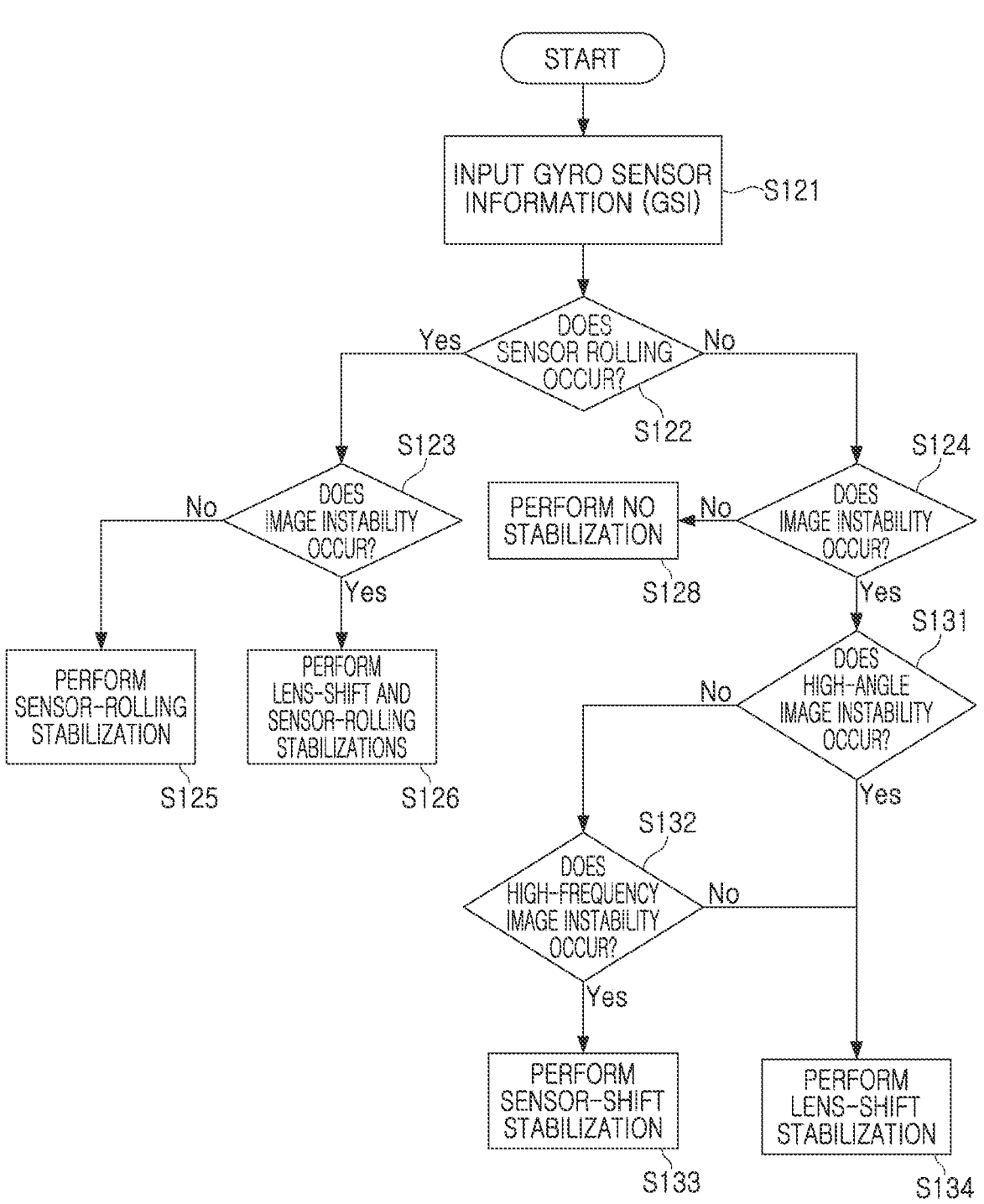

Referring to FIG. 32, the driver circuit 10 may determine image instability of the camera module 1 based on gyro sensor information GSI, and perform control to perform sensor-rolling stabilization for the image sensor S by providing a sensor driving signal Sd2 for driving sensor rolling to the third driving portion 700 when sensor rolling rather than image instability occurs based on an image-instability determination result (S121, S122, S123, and S125).

The driver circuit 10 may perform control to perform lens-shift stabilization for the lens module 100 and the sensor-rolling stabilization for the image sensor S by providing a lens driving signal Sd1 for driving lens shift to the second driving portion 600 and providing the sensor driving signal Sd2 for driving sensor rolling to the third driving portion 700 when both the sensor rolling and the image instability occur based on the image-instability determination result (S121, S122, S123 and S126).

The driver circuit 10 may perform control to perform sensor-shift stabilization for the image sensor S by providing a sensor driving signal Sd2 for driving sensor shift to the third driving portion 700 when the image instability rather than the sensor rolling occurs, and the image instability is a high-frequency image instability rather than a high-angle image instability based on the image-instability determination result (S121, S122, S124, S131, S132, and S133).

The driver circuit 10 may perform control to perform the lens-shift stabilization for the lens module 100 by providing the lens driving signal Sd1 for driving lens shift to the second driving portion 600 when the image instability rather than the sensor rolling occurs and the image instability is the high-angle image instability rather than the high-frequency image instability based on the image-instability determination result (S121, S122, S124, S131, and S134).

The driver circuit 10 may perform control to perform no stabilization when neither the sensor rolling nor the image instability occurs based on the image-instability determination result (S121, S122, S124 and S128).

As described above, the camera module according to the embodiments of the present disclosure may have an improved optical image stabilization performance.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and are not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:

an autofocusing (AF) housing having an internal space;

a lens module disposed in the internal space of the AF housing and configured to be movable relative to the AF housing in an optical axis direction of the lens module relative to the AF housing;

a sensor substrate on which an image sensor configured to receive light passing through the lens module is disposed;

a moving frame coupled to a portion of the sensor substrate; and an optical image stabilization (OIS) housing disposed between the AF housing and the moving frame, wherein the AF housing is configured to be movable relative to the OIS housing together with the lens module in a direction perpendicular to an optical axis of the lens module, and the moving frame is configured to be movable together with the image sensor in the direction perpendicular to the optical axis.

2. The camera module of claim 1, further comprising:

a first driving portion comprising a first magnet coupled to the lens module, and a first coil facing the first magnet; and a first ball unit disposed between the AF housing and the lens module, wherein the first ball unit comprises a first ball group and a second ball group spaced apart from each other in a first axis direction perpendicular to the optical axis and each comprising a plurality of balls disposed in a direction parallel to the optical axis, and a number of the plurality of balls of the first ball group is greater than a number of the plurality of balls of the second ball group.

3. The camera module of claim 2, wherein the lens module comprises a first guide part protruding in the optical axis direction, the AF housing comprises a second guide part protruding in the optical axis direction and accommodating the first guide part of the lens module, guide grooves are formed in each of surfaces of the first guide part and the second guide part facing each other in the direction perpendicular to the optical axis, and the plurality of balls of the first ball group and the plurality of balls of the second ball group are disposed in the guide grooves.

4. The camera module of claim 3, further comprising a first protrusion part and a second protrusion part each disposed on the second guide part of the AF housing, wherein the first protrusion part protrudes toward the first ball group in the optical axis direction, the second protrusion part protrudes toward the second ball group in the optical axis direction, and a length of the second protrusion part in the optical axis direction is greater than a length of the first protrusion part in the optical axis direction.

5. The camera module of claim 3, wherein the OIS housing comprises a stepped part accommodating at least a portion of the second guide part of the AF housing.

6. The camera module of claim 1, wherein the AF housing is further configured to be movable relative to the OIS housing in a first axis direction perpendicular to the optical axis or a second axis direction perpendicular to both the optical axis and the first axis direction.

7. The camera module of claim 1, wherein the moving frame is further configured to be movable relative to the OIS housing in a first axis direction perpendicular to the optical axis or a second axis direction perpendicular to both the optical axis and the first axis direction.

8. The camera module of claim 1, wherein a movement of the AF housing and a movement of the moving frame are controllable independently of each other.

9. The camera module of claim 1, further comprising:

a second driving portion comprising a plurality of magnets disposed on the OIS housing, and a plurality of coils fixed to the AF housing;

a third driving portion comprising a plurality of magnets disposed on the OIS housing, and a plurality of coils fixed to the moving frame;

a second ball unit disposed between the AF housing and the OIS housing; and a third ball unit disposed between the OIS housing and the moving frame.

10. The camera module of claim 9, wherein the second driving portion comprises:

a first sub-driving portion configured to generate a driving force in a first axis direction perpendicular to the optical axis; and a second sub-driving portion configured to generate a driving force in a second axis direction perpendicular to both the optical axis and the first axis direction, the first sub-driving portion comprises a second magnet disposed on the OIS housing and a second coil fixed to the AF housing, and the second sub-driving portion comprises a third magnet disposed on the OIS housing and a third coil fixed to the AF housing.

11. The camera module of claim 10, wherein either one or both of the second magnet and the third magnet comprises two magnets, either one or both of the second coil and the third coil comprises two coils, and the second driving portion further comprises at least two position sensors facing the two magnets.

12. The camera module of claim 9, wherein the third driving portion comprises:

a third sub-driving portion configured to generate a driving force in a first axis direction perpendicular to the optical axis; and a fourth sub-driving portion configured to generate a driving force in a second axis direction perpendicular to both the optical axis and the first axis direction, the third sub-driving portion comprises a fourth magnet disposed on the OIS housing and a fourth coil fixed to the moving frame, and the fourth sub-driving portion comprises a fifth magnet disposed on the OIS housing and a fifth coil fixed to the moving frame.

13. The camera module of claim 12, wherein either one or both of the fourth magnet and the fifth magnet comprises two magnets, either one or both of the fourth coil and the fifth coil comprises two coils, and the third driving portion further comprises at least two position sensors facing the two magnets.

14. The camera module of claim 9, wherein the moving frame comprises:

a first frame in which the plurality of coils of the third driving portion are mounted;

a second frame to which the first frame is coupled; and a wiring pattern disposed in the first frame and connected to the plurality of coils of the third driving portion, and a portion of the wiring pattern is exposed externally from the first frame or the second frame.

15. The camera module of claim 14, wherein the first frame and the second frame are made of a same plastic material or different plastic materials, and a boundary line is formed where the first frame and the second frame contact each other.

16. The camera module of claim 14, wherein a portion of the wiring pattern is connected to the sensor substrate.

17. The camera module of claim 9, wherein the second ball unit comprises a plurality of second balls, the third ball unit comprises a plurality of third balls, guide grooves in which the plurality of second balls of the second ball unit are disposed are formed in either one or both of surfaces of the AF housing and the OIS housing facing each other in the optical axis direction, guide grooves in which the plurality of third balls of the third ball unit are disposed are formed in either one or both of surfaces of the OIS housing and the moving frame facing each other in the optical axis direction, each of the guide grooves in which the plurality of second balls of the second ball unit are disposed has a polygonal or circular shape having a size larger than a diameter of each of the plurality of second balls of the second ball unit, and each of the guide grooves in which the plurality of third balls of the third ball unit are disposed has a polygonal or circular shape having a size larger than a diameter of each of the plurality of third balls of the third ball unit.

18. The camera module of claim 1, wherein the sensor substrate comprises a first OIS substrate and a second OIS substrate, a portion of the first OIS substrate is coupled to the AF housing, and a portion of the second OIS substrate is coupled to the moving frame.

19. The camera module of claim 18, wherein the first OIS substrate comprises:

a first moving part coupled to the AF housing;

a first fixed part coupled to the OIS housing; and a first connection part connecting the first moving part and the first fixed part to each other, the first connection part extends along at least a portion of a perimeter of the moving part, and the first connection part comprises a plurality of slits each passing through the first connection part in the optical axis direction.

20. The camera module of claim 19, wherein the first connection part further comprises a first support part and a second support part, the first support part is connected to the first moving part and spaced apart from the first fixed part, and the second support part is connected to the first fixed part and spaced apart from the first moving part.

21. The camera module of claim 18, wherein the second OIS substrate comprises:

a second moving part coupled to the moving frame;

a second fixed part coupled to the OIS housing; and a second connection part connecting the second moving part and the second fixed part to each other, the second connection part extends along the perimeter of the moving part, and the second connection part comprises a plurality of slits passing through the second connection part in the optical axis direction.

22. The camera module of claim 21, wherein the second connection part comprises a third support part and a fourth support part, the third support part is connected to the second fixed part and spaced apart from the second moving part, and the fourth support part is connected to the second moving part and spaced apart from the second fixed part.

23. A camera module comprising:

an autofocusing (AF) housing having an internal space;

a lens module disposed in the internal space of the AF housing;

a sensor substrate on which an image sensor configured to receive light passing through the lens module is disposed;

a moving frame coupled to a portion of the sensor substrate;

an optical image stabilization (OIS) housing disposed between the AF housing and the moving frame;

a first ball unit disposed between the AF housing and the lens module;

a second ball unit disposed between the AF housing and the OIS housing; and a third ball unit disposed between the OIS housing and the moving frame, wherein the lens module is configured to be movable in directions of three axes perpendicular to one another, and the image sensor is configured to be movable on a plane perpendicular to an optical axis of the lens module.

24. The camera module of claim 23, wherein the lens module is further configured to be movable in an optical axis direction of the lens module relative to the AF housing, and movable relative to the OIS housing on a second plane perpendicular to the optical axis together with the AF housing.

25. The camera module of claim 23, wherein the image sensor is further configured to be movable on the plane perpendicular to the optical axis together with the moving frame.

26. The camera module of claim 23, wherein the lens module and the image sensor are further configured to move in opposite directions along an axis perpendicular to the optical axis during optical image stabilization.

27. The camera module of claim 23, wherein the sensor substrate comprises:

an autofocusing (AF) substrate;

a first optical image stabilization (OIS) substrate; and a second optical image stabilization (OIS) substrate, the AF substrate is coupled to the AF housing, a portion of the first OIS substrate is coupled to the AF housing and another portion of the first OIS substrate is coupled to the OIS housing, and a portion of the second OIS substrate is coupled to the moving frame and another portion of the second OIS substrate is coupled to the OIS housing.

28. The camera module of claim 27, further comprising:

a first driving portion configured to generate a driving force in the optical axis direction, and comprising a magnet and a coil;

a second driving portion configured to generate a driving force in a first axis direction perpendicular to the optical axis direction or a second axis direction perpendicular to both the optical axis direction and the first axis direction, and comprising a plurality of magnets and a plurality of coils; and a third driving portion configured to generate a driving force in the first axis direction or the second axis direction, and comprising a plurality of magnets and a plurality of coils, wherein the coil of the first driving portion is disposed on the AF substrate, the plurality of coils of the second driving portion are disposed on the first OIS substrate, and the plurality of coils of the third driving portion are disposed on the second OIS substrate.

29. A camera module comprising:

a lens module;

an image sensor configured to receive light passing through the lens module;

a first driving portion configured to drive the lens module in an optical axis direction of the lens module to perform autofocusing;

a second driving portion configured to drive the lens module on a first plane perpendicular to an optical axis of the lens module to perform optical image stabilization; and a third driving portion configured to drive the image sensor on a second plane perpendicular to the optical axis of the lens module to perform optical image stabilization while the lens module is being driven by the second driving portion to perform optical image stabilization.

30. The camera module of claim 29, wherein the second driving portion is further configured to drive the lens module on the first plane in one direction; and the third driving portion is further configured to drive the image sensor on the second plane in another direction opposite to the one direction.

31. The camera module of claim 29, wherein the second driving portion is further configured to drive the lens module on the first plane in a first axis direction perpendicular to the optical axis, and a second axis direction perpendicular to the optical axis and the first axis direction, and the third driving portion is further configured to drive the image sensor on the second plane in the first axis direction and the second axis direction.

32. The camera module of claim 31, wherein the second driving portion is further configured to rotate the lens module about the optical axis of the lens module or an optical axis parallel to the optical axis of the lens module, and the third driving portion is further configured to rotate the image sensor about the optical axis of the lens module or the optical axis parallel to the optical axis of the lens module.

33. A camera module comprising:

an autofocusing (AF) housing;

a lens module supported by the AF housing and configured to be movable relative to the AF housing in an optical axis direction of the lens module;

a moving frame;

an image sensor configured to receive light passing through the lens module and coupled to the moving frame to maintain the image sensor at a fixed position relative to the moving frame;

an optical image stabilization (OIS) housing disposed between the AF housing and the moving frame, wherein the AF housing is configured to be movable together with the lens module relative to the OIS housing in a first axis direction perpendicular to an optical axis of the lens module and a second axis direction perpendicular to both the optical axis and the first axis direction, and to be rotatable about the optical axis or an axis parallel to the optical axis; and the moving frame is configured to be movable together with the image sensor relative to the OIS housing in the first axis direction and the second axis direction, and to be rotatable about the optical axis or the axis parallel to the optical axis.

34. The camera module of claim 33, further comprising:

a first driving portion comprising a first magnet disposed on the lens module, and a first coil supported by the AF housing and facing the first magnet, the first driving portion being configured to drive the lens module in the optical axis direction;

a second driving portion comprising a second magnet and a third magnet disposed on the OIS housing, and a second coil and a third coil supported by the AF housing and respectively facing the second magnet and the third magnet, the second driving portion being configured to drive the AF housing together with lens module relative to the OIS housing in the first axis direction and the second axis direction, and to rotate the AF housing together with the lens module about the optical axis or the axis parallel to the optical axis; and a third driving portion comprising a fourth magnet and a fifth magnet disposed on the OIS housing, and a fourth coil and a fifth coil supported by the moving frame and respectively facing the fourth magnet and the fifth magnet, the third driving portion being configured to drive the moving frame together with the image sensor relative to the OIS housing in the first axis direction and the second axis direction, and to rotate the moving frame together with the image sensor about the optical axis or the axis parallel to the optical axis.

35. The camera module of claim 34, wherein the lens module comprises a first part protruding farther in the optical axis direction toward the AF housing than a remaining part of the lens module, and the first magnet is mounted on the first part of the lens module, and the AF housing comprises a second part protruding farther in the optical axis direction toward the OIS housing than a remaining part of the AF housing, and the first coil is mounted on the second part of the AF housing.

36. The camera module of claim 34, wherein the AF housing comprises through-holes in which the second coil and the third coil are disposed, the OIS housing comprises mounting grooves on a surface of the OIS housing facing the AF housing in which the second magnet and the third magnet are disposed, and mounting grooves on a surface of the OIS housing facing the moving frame in which the fourth magnet and the fifth magnet are disposed, and the moving frame comprises mounting grooves on a surface of the moving frame facing the OIS housing in which the fourth coil and the fifth coil are disposed.

37. The camera module of claim 33, further comprising:

a first driving portion comprising a first magnet disposed on the lens module, and a first coil supported by the AF housing and facing the first magnet, the first driving portion being configured to drive the lens module in the optical axis direction;

a first common magnet and a second common magnet supported by the OIS housing;

a second driving portion comprising a second coil and a third coil supported by the AF housing and respectively facing the first common magnet in the first axis direction and the second common magnet in the second axis direction, the second driving portion being configured to drive the AF housing together with lens module relative to the OIS housing in the first axis direction and the second axis direction, and to rotate the AF housing together with the lens module about the optical axis or the axis parallel to the optical axis; and a third driving portion comprising a fourth coil and a fifth coil supported by the moving frame and respectively facing the first common magnet in the optical axis direction and the fifth magnet in the optical axis direction, the third driving portion being configured to drive the moving frame together with the image sensor relative to the OIS housing in the first axis direction and the second axis direction, and to rotate the moving frame together with the image sensor about the optical axis or the axis parallel to the optical axis.

\* \* \* \* \*